United States Patent

Luckey

[15] 3,668,142
[45] June 6, 1972

[54] PREPARATION OF PHOSPHORS

[72] Inventor: George William Luckey, Rochester, N.Y.

[73] Assignee: Eastman Kodak Company, Rochester, N.Y.

[22] Filed: Nov. 16, 1970

[21] Appl. No.: 90,031

Related U.S. Application Data

[60] Division of Ser. No. 657,062, July 31, 1967, which is a continuation-in-part of Ser. No. 390,741, Aug. 19, 1964, abandoned, which is a continuation-in-part of Ser. No. 346,395, Feb. 21, 1964, abandoned.

[52] U.S. Cl. .................................252/301.5, 23/51, 23/53, 23/59, 23/88, 23/105, 23/110, 23/66, 23/90, 23/122, 23/127, 23/134, 252/301. 4 R, 252/301.4 S, 252/301.4 F, 252/301.4 P, 252/301.6 R
[51] Int. Cl. ............................................................C09k 1/04
[58] Field of Search....................................252/301.4–301.6; 23/117, 88, 51, 110, 105, 53, 59, 134, 127, 122, 305, 304, 66, 90

[56] References Cited

FOREIGN PATENTS OR APPLICATIONS

741,324  11/1955  Great Britain......................252/301.4

Primary Examiner—Robert D. Edmonds
Attorney—William H. J. Kline, Bernard D. Wiese and Allen P. Rosenberg

[57] ABSTRACT

Inorganic phosphors are prepared by separately introducing the anions and cations to form the phosphor into a reaction solution; maintaining in the reaction solution, throughout the reaction, an excess of up to 1 molar of the anion or cation; preventing local excesses of anions and cations; and, growing crystals of the phosphor to at least 0.5 micron.

7 Claims, No Drawings

PREPARATION OF PHOSPHORS

This application is a division of copending U.S. application Ser. No. 657,062 filed July 31, 1967, in turn a continuation-in-part application of copending U.S. application Ser. No. 390,741 filed Aug. 19, 1964 (now abandoned), in turn a continuation-in-part application of copending U.S. application Ser. No. 346,395 filed Feb. 21, 1964 (now abandoned).

This invention relates to phosphors, and more particularly to a method for forming phosphors which are relatively non-ionic.

Leverenz in *An Introduction to Luminescence of Solids* published by John Wiley and Sons, Inc. of N.Y., 1950 at page 83, notes that substances which are relatively non-ionic, such as zinc sulfide and barium sulfate, or materials incorporating large portions of these substances, must be heated to temperatures on the order of 1,000° C. to make them efficiently luminescent. The step of heating such substances to such elevated temperatures has been referred to in the art as "igniting," "firing" or "calcining." The step of igniting phosphors sometimes is conducted in the presence of a flux. The flux may be, for example, sodium sulfate, lithium carbonate, an alkali chloride, an alkali fluoride, an alkaline earth fluoride, borax and the like. Ignition in the presence of a flux results in growth of the crystals, and consequent changes in the size distribution. While ignition has provided phosphors of fairly efficient luminescence, it is an inconvenient and expensive step in manufacturing operations. In addition, the firing operation substantially increases the chance for contamination of the phosphors. Ignition requires high temperatures and therefore, special containers, such as porcelain or alumina crucibles, as described in British Pat. No. 540,252. It would therefore, be highly desirable to provide a method for forming phosphors which does not require such elevated temperatures.

One method for obtaining efficiently luminescent phosphors which does not require ignition has been suggested by Ruthruff in U.S. Pat. No. 2,285,464. That technique involves precipitation of the phosphor at very high temperatures, and thus requires superatmospheric pressures. It would be desirable to provide a method for preparing efficiently luminescent phosphors which does not require precipitation at elevated temperatures under superatmospheric pressures.

In accordance with the present invention, phosphors are formed under novel reaction conditions, which can be conducted at ambient pressures. Phosphors prepared by the novel method of the invention are efficiently luminescent as obtained, or can be readily made efficiently luminescent without igniting with a flux at elevated temperatures.

One object of this invention is to provide a novel method for forming phosphors.

Another object of this invention is to provide novel methods for preparing efficiently luminescent phosphors.

A further object of this invention is to provide a novel method for forming phosphors which does not require ignition at elevated temperatures to make the phosphors efficiently luminescent at temperatures above −25° C.

Another object of this invention is to provide a novel method for forming phosphors, which method does not require precipitation under superatmospheric pressures in order to make them efficiently luminescent.

Still other objects of this invention will be apparent from the following disclosure and the appended claims.

In accordance with one embodiment of this invention, a method is provided for forming phosphors which contain an anion and a cation, and which have a solubility in water less than 5 g. per liter at 25° C., which comprises separately introducing the anions and cations to form the phosphor into a reaction solution; maintaining in the reaction solution, throughout the reaction, an excess of cation or anion up to about 1 molar; preventing local excesses of anions and cations in the reaction solution; and, growing crystals of the phosphors in the reaction solution to a size of at least 0.5 micron in substantial proportions. Typically at least about 40 percent and more generally at least about 50 percent, by weight, of the phosphor is composed of crystals of this size. Suitable activator ions, in the desired proportionate concentrations, can be added to the reaction solution. Phosphors prepared in accordance with this technique are either efficiency luminescent as obtained, or can be readily made efficiently luminescent by a ripening, a heating, or a ripening and heating procedure, as described below.

In accordance with another embodiment of this invention, phosphors containing an anion and a cation, and which phosphors have a solubility in water of less than 5 grams per liter at 25° C., are prepared by separately introducing into a reaction solution (1) anion to form the phosphor at the rate of up to 0.1 mole anion per liter of available reaction solution per minute and (2) cation to form the phosphor at the rate of up to 0.1 mole cation per liter of available reaction solution per minute; preventing local excesses of the cations and anions in said reaction solution; and, growing crystals of the phosphor to at least 0.5 micron in size. The rate of addition of anion and cation, each, can be less than 0.1, or even less than 0.04 mole per liter of reaction solution per minute. Activator ions can be introduced at rates which, based on the rate of addition of anion and cation to form the phosphor, are in proportion to the final percentage of activator desired in the phosphor.

Anion and cation to form the phosphor are conveniently added to the reaction solution from separate solutions, which can have concentrations of anion or cation up to about 1.5 molar, although these solutions preferably are less concentrated than 1 molar. Especially good results are achieved when the solutions are less concentrated than 0.5 molar. Salts of these anions and cations are advantageously dissolved in these solutions. Any salts can be used which do not have a deleterious effect on the phosphor. Large concentrations of nitrate ion should not be introduced into the reaction solution since coprecipitation of this anion reduces luminescence of most of the phosphors prepared in accordance with the invention. Generally, the reaction of the invention is conducted in the absence of nitrate ion.

The maximum concentration of anion, cation and any activator ion in the reaction solution, or of the solutions of reactants added to the reaction solution, depends upon the efficiency of the means used to prevent local excess of reactants. More efficient prevention of local excesses allows higher concentrations.

The formation of phosphors in accordance with the present invention features the reaction of low concentrations of the anions and cations required to form the phosphors in a suitable solution, and prevention of local excesses of the anions and cations in the reaction solution. Advantageously, an excess of up to 1 molar anion or cation is maintained in the reaction solution, throughout the reaction. In preferred embodiments of the invention, the concentration of anion and cation, each is up to about 0.5 molar. Especially good results are obtained with concentrations up to 0.1 molar, such as from 0.015 to 0.02 molar.

Although there are exceptions, as a general guide excess cation is employed when the activator is an anion, and an excess of anion is employed when the activator is a cation. Since there are exceptions to this guide, a sample of each phosphor should be prepared with an excess of anion and another sample prepared with an excess of cation, to determine which gives most efficient luminescence. With some phosphors, optimum luminescence does not depend on whether the anion or cation is maintained in excess in the reaction solution. However, an excess of either anion or cation is used to control grain size, even if not required for best luminescence.

With many phosphors, an activator is required. The concentration of activator ions in the reaction solution is based on the amount of anion and cation in the solution, and preferably is in proportion to the amount of activator desired in the phosphor. The dilute concentration of anions and cations in the reaction solution can be maintained in any convenient way. For example, the reaction vessel can be provided with a suitable solvent, and suitable solutions of the anions and cations required to form the phosphors, together with any activator ions required, can be metered into the reaction solution at a predetermined rate to maintain the desired low concentration of ions throughout the reaction.

The reaction solution advantageously has solubility characteristics for the phosphor which allow the growth of crystals of the phosphor, under the reaction conditions of the invention, to above at least 0.5 micron, and preferably at least above 1 micron, in size during precipitation. Any suitable reaction solution can be used which allows such growth of crystals of the phosphors. Aqueous solutions are highly useful. Various organic solvents could be used, if desired, such as formamide, alcohols (e.g., methanol, ethanol, propanol)dimethyl formamide, acetic acid and the like. The pH of the reaction solution can be regulated, for example with the addition of an acid or base, to provide proper characteristics for the growth of phosphor crystals. The pH can be regulated with any acid or base which has anions or cations that do not substantially reduce or quench fluorescence of the phosphor when incorporated in the crystal lattice. The proper pH to allow growth of the phosphor crystals to a suitable size, such as at least 0.5 micron, can be readily determined by those skilled in the art.

The reaction of the invention can be conducted without the use of superatmospheric pressure. The reaction can be conducted over a relatively wide temperature range. Good results are generally obtained when the reaction solution is within a temperature range of from about 20° to 100° C. Lower temperatures can be employed. Generally, it is advantageous to use temperatures of from 70° to 100° C. Also, higher temperatures could be employed, although temperatures higher than 100° C. are not necessary to obtain good results in accordance with the invention. Relatively low reaction temperatures are advantageous in the preparation of certain phosphors. Solutions of anions and cations, as well as solutions of any activator ion and acid or base to regulate the pH of the reaction solution, can be heated prior to introducing such solutions into the reaction solution.

In accordance with the invention, local excesses of reactants (i.e., anion, cation and any activator ion) in the reaction solution are prevented. Prevention of local excesses of reactants is important in growing the phosphor crystals to the desired size and form. Local excesses result in decreased luminescence of the phosphor. Local excesses of reactants can be prevented in any convenient manner. For example, solution of reactants can be sprayed onto the reaction solution. Another technique which can be utilized to prevent local excesses is to introduce the solution of reactants through a plurality of jets located at various points in the reaction solution. Still another method is to pass the reaction solution through a suitable conduit, and add solutions of reactants to the flowing reaction solution. When the latter method is employed, the concentration ranges given above are based on the available reaction solution. Preferably, the reaction of the invention is carried out under conditions of efficient agitation. Efficient agitation, coupled with the maintenance of dilute concentrations of anions and cations in reagent solutions, effectively prevent large local excesses of these ions in the reaction solution. Satisfactory agitation can be provided in any convenient manner, such as by conducting precipitation in a vessel (preferably spherical) provided with several baffles in the interior walls thereof, and stirring at a relatively high speed with a suitable stirrer. Further prevention of local excesses can be achieved by agitating and introducing the cations and anions required to form the phosphor into the reaction vessel through a plurality of jets or orifices placed around the reaction vessel. Good prevention of local excesses is provided when a 4-liter beaker, 6 inches in diameter and containing more than about 200 ml. of solution, is agitated by a centrally located polytetrafluoroethylene-coated magnetic stirring bar three-eighths inch in diameter and 1 7/8 inches long, rotating at 500 to 1,000 rpm., with the addition of cations and anions from two separate jets on separate sides of the beaker, the rate of addition of anions and cations being less than 0.025 mole/liter/minute. When the same number of jets are used in a 22-liter round bottom flask, with four equally spaced vertical indentations, 1½ inches deep in the wall, good results can be obtained by agitating more than 4 liters of solution with a tubular glass stirrer two inches long with 1½ inches inner diameter and three-fourths inch outer diameter, rotating at 1,000 to 2,000 rpm., and adding solution of the cations and anions at a rate of less than 0.1 mole/liter/minute separately through jets located on opposite sides of the flask between the indentations.

The concentrations of the cations and anions in the solutions added to the reaction solution can be varied according to the reaction conditions, especially the quantity of reaction solution employed and the amount of agitation which is utilized. As a general guideline, useful results are obtained when the concentrations of cations and anions in the separate solutions being added are each less than about 1.5 molar. Advantageously, the concentrations of the anions and cations in the solutions being added to the reaction solution are less than 1.0 molar and in some instances it is desirable to use concentrations less than about 0.5 molar. The rates of addition of anions and cations are selected to maintain in the reaction solution a concentration thereof less than 1.0 molar. A rate of addition on the order of about less than 0.1, and advantageously less than about 0.04 mole anion and cation per liter of reaction solution per minute provides phosphors which are efficiently luminescent.

Many phosphors prepared in accordance with the invention are obtained from the reaction solution in a form which is efficiently luminescent, with no after-treatment required. Other phosphors formed in accordance with the invention are obtained in a unique crystal form, and can readily be made efficiently luminescent without resorting to the undesirable ignition processes in the prior art. The efficiency of some classes of phosphors is greatly enhanced simply by ripening the crystals. Ripening, as used herein and in the appended claims, refers to heating the phosphor crystals, for example in the supernatant liquid or in a specially designed solution, for a short period of time at moderate temperatures. The time required to ripen the crystal varies, but generally up to four hours is sufficient, depending on the temperature employed. Elevated temperatures such as about 70° to 100° C. are suitable for ripening, although lower or higher temperatures can be used. The mechanism by which ripening enhances luminescence is not completely understood, but there are indications that the crystal structure is improved, i.e., the structural disorder is decreased.

Phosphors prepared in accordance with this invention are efficiently luminescent as precipitated, or can be made efficiently luminescent by the ripening procedure described herein. Certain phosphors, such as calcium tungstate, can be further increased in efficiency by heating. It should be noted that these phosphors are highly useful without any heating. Such phosphors which are efficiently luminescent, can be prepared in accordance with the invention, using the ripening procedure herein, and not using any further heating treatment. Heating these phosphors can further increase their efficiency. Hence, the heating step is clearly optional with such phosphors. As an alternative, phosphors of this type can be heated after precipitation in accordance with the invention to provide efficient luminescence, without ripening. Heating (with or without ripening) to temperatures of up to about 700° C. for a short time, such as one-half to one hour, is generally adequate. This heat treatment should be distinguished from prior art ignition, which classically requires higher temperatures and a longer period of treatment at elevated temperatures, and may require a flux.

Heretofore, efficient luminescence of these phosphors has been achieved under practical conditions only by an ignition process. The reaction conditions featured in the present invention allow the growth of crystals to their final shape, size, and form during the precipitation and ripening process. The size distributions of the crystals obtained with the reaction conditions of the invention are highly uniform, and are not affected substantially by the subsequent heating treatment. Ignition has often involved changes in the size and size distribution of the phosphor crystals.

The reaction conditions described above are useful in the formation of inorganic phosphors containing cation and anion, which phosphors have a solubility in water of less than 5 g. per liter at 25° C. As used herein, and in the appended claims, phosphors which decompose in water, and which cannot be recovered substantially unchanged by evaporation of the water, are deemed to have a solubility in water of less than 5 g. per liter at 25° C. Typical of the phosphors which decompose in water, and are deemed to have the solubility characteristics referred to above, are barium fluorochloride and barium sulfide. The solubility criteria given eliminate phosphors which are relatively ionic, such as phosphors containing substantial amounts of alkali metal or ammonium ion. Such phosphors tend to be efficiently luminescent without requiring the special reaction conditions provided by the present invention.

Inorganic phosphors which can be prepared in accordance with the present invention have the solubility characteristics referred to above, and include phosphors the molecules of which contain (1) fluoride ion, or (2) at least one covalently bonded atom. The method of the invention is useful in the preparation of phosphors which are excited by X-rays. The invention is also useful in preparing other phosphors which have heretofore required ignition for efficient luminescence. These phosphors contain a cation, anion, and, optionally, an activator. The phosphors can contain more than one cation, anion or activator. The cation (or cations) in the phosphor can be any elements which are cations in Series 3–11 of Mendeleeff's Periodic Table, Handbook of Chemistry and Physics, Thirtieth Edition, published by Chemical Rubber Publishing Co., Cleveland, Ohio, 1946, pages 310 and 311. Alkali metals, noble metals and actinides can be excluded (although these elements can be present as minor constituents, e.g., as an activator in the phosphor), because phosphors made from them can be readily prepared by other techniques. Typical cations in phosphors are, for example, rare earths and the alkaline earths. Typical cations which can be included in phosphors prepared by the invention include barium, calcium, strontium, bismuth, cadmium, cerium, gallium, indium, lanthanum, lead, yttrium, zinc, and zirconium. The anion(or anions) of phosphors which can be prepared in accordance with this invention includes all of those anions which are useful in phosphors having the above solubility criteria, such as sulfate, borate, fluoride (including fluorohalides), tungstate, carbonate, silicate, vanadate, phosphate, arsenate, sulfide, and molybdate and other related anions comprising elements in Groups VI and VII and combinations of elements in Groups IV–VII. The phosphor can be self-activated, or if desired activated with one or more elements, such as lead, thallium, copper, manganese or a rare earth, including elements in the lanthanide series, i.e., elements numbered 57 through 71. Typical of the phosphors which can be prepared in accordance with the invention include barium lead sulfate, lanthanide-activated barium sulfate, lead sulfate, barium fluorochloride, barium fluoride, calcium tungstate, the heavy metal carbonate phosphors, lanthanide-activated barium phosphate, barium bismuth sulfate and barium calcium manganese sulfate.

This invention is particularly useful in the preparation of phosphors which are excited by x-rays. When these phosphors are prepared by the process of the invention, they have a speed which is usually at least 20 percent, and frequently 100 percent or higher than, that of corresponding ignited prior art phosphors. The process of this invention is also applicable to phosphors that are excited by cathode rays or ultraviolet radiation. However, many of these phosphors are easier to prepare and may not require the special techniques of the invention.

The present invention is highly useful in preparing phosphors which contain sulfate as anion. Sulfate phosphors formed in accordance with the invention have efficient fluorescence without the necessity for any after treatment. Sulfate phosphors can be prepared in accordance with the invention which have a luminescence as efficient, and sometimes more efficient, than the ignited sulfate phosphors of the prior art.

This invention is highly useful in the preparation of barium lead sulfate phosphors. As used herein, the term "barium lead sulfate phosphors" refers to crystals each of which contains both barium sulfate and lead sulfate in solid solution, as distinguished from physical mixtures of crystals some of which only contain barium sulfate and others of which contain only lead sulfate. These phosphors can be prepared in accordance with the invention by maintaining in a reaction solution a concentration of up to about 1 molar sulfate ions throughout most of the reaction. The ratio of barium ions to lead ions is preferably adjusted in the solution so that the phosphor contains from about 2 to 50 mole percent lead, although wider lead concentrations can be employed if desired. Optimum intensity of luminescence is generally obtained with phosphors which contain about 10 mole percent lead. Best results are obtained in accordance with the invention by maintaining an excess of sulfate ion in the reaction solution throughout the reaction. The excess of sulfate ions in the reaction solution can be up to about 1 molar excess over the amount required to react with the total quantity of barium and lead ions in the reaction solution. Especially good results are obtained when the excess of sulfate ions in the reaction solution is less than 0.1 molar over the amount required to react with the barium and lead ions in the reaction solution. These phosphors can be prepared by introducing barium and lead ions into a reaction solution, for example at a rate less than about 0.1 mole combined barium and lead ions per liter of reaction solution per minute; maintaining an excess of sulfate ions in the reaction solution of less than about 0.5 molar over the amount required to react with the barium and lead ions, and preventing local excesses of the several ions in the reaction solution throughout the reaction, for example by agitation.

In one highly useful technique for preparing barium lead sulfate phosphors, an aqueous reaction solution is provided, barium and lead ions are introduced, preferably in the form of the water soluble salts thereof, and preferably in aqueous solution containing less than about 0.5 molar barium and lead ions, into the reaction solution at the rate of less than about 0.1 mole, and preferably less than about 0.04 mole combined barium and lead ions, per liter of reaction solution per minute; maintaining in the reaction solution an excess of sulfate ions over that required to react with the barium and lead ions in the reaction solution, said excess being preferably less than about 0.1 molar; holding the pH of the reaction solution at preferably less than about 1.0 with the addition of an acid; and, maintaining the temperature of the reaction at from about 70° to 100° C.

Barium lead sulfate phosphors prepared in accordance with this invention have efficient luminescence. Luminescence of phosphors obtained by this invention is generally equal to, and is frequently superior, to the luminescence of ignited barium lead sulfate phosphors of the prior art.

In the preparation of barium lead sulfate phosphors in accordance with the invention, it is preferred to maintain in the reaction solution a controlled excess of sulfate ions, such as up to 0.5 molar, and preferably not in excess of 0.1 molar, over the amount required to react with the barium and lead ions present in the reaction solution. The excess of sulfate ions maintained throughout the reaction results in phosphors which have exceptionally efficient luminescence. The excess of sulfate ions may be maintained throughout the reaction by metering a solution containing a controlled concentration of sulfate ions into the reaction solution to replace the sulfate ions which react with the barium and lead ions introduced during the reaction. The concentration of the sulfate solution added to the reaction can be 1.5 molar or higher, although best results are obtained when the concentration is less than about 1.5 molar. When higher concentrations of sulfate ions are introduced into the reaction solution, local excesses of sulfate ions may be formed, which results in phosphors having less efficient luminescence. The sulfate ions may be provided in a suitable manner, such as by using sulfates of metals in Groups I, II and III of Mendeleeff's Periodic Table, e.g., sodium sulfate, potassium sulfate, calcium sulfate, zinc sulfate, aluminum sulfate, and indium sulfate. Good barium lead sulfate phosphors can be prepared when an excess of sulfate ions is not maintained throughout the reaction. However, most efficient luminescence is obtained by using the excess sulfate ion throughout the reaction.

Barium and lead salts, such as barium and lead halides or acetates, can be introduced into the reaction solution. Advantageously, the ratio of barium to lead ions is adjusted, as indicated above, so that the barium lead sulfate phosphor contains from 2 to 50 mole percent lead. In order to avoid local excesses, the barium lead ions (from separate or combined solutions containing barium and lead ions) are introduced into the reaction solution at a rate of less than about 0.1 mole (combined concentration of barium and lead ions) per liter of reaction solution per minute, while maintaining the preferred excess of sulfate ion. Particularly good results are obtained when the barium and lead ions are added at the rate of less than about 0.04 mole per liter of reaction solution per minute. Best results are obtained when the concentration of barium and lead ions in the reagent solutions which are added to the reaction solution is less than about 0.5 molar. The best results are obtained, as in the preparation of most phosphors in accordance with this invention, when the reaction is conducted in the absence of nitrate ions.

In some instances, it is desirable but not always necessary in the preparation of barium lead sulfate phosphors to incorporate an univalent cation (other than hydrogen) in the reaction solution to further enhance fluorescence. Typical useful univalent cations are lithium, sodium,potassium,cesium,and ammonium. Effective increases in fluorescence can be obtained using a wide concentration range of univalent cations in the reaction solution. As little as 0.01 percent univalent cation in the phosphor, based on the weight of the phosphor, provides increased efficiency of luminescence.

The preferred reaction solution for the preparation of most sulfate phosphors, such as barium lead sulfate, is an aqueous acidic solution having a pH of up to 2.0. Generally, best results are obtained with acidic solutions having a pH of less than 1.0. Especially good results are achieved at a pH of 0.5. The acidity of the reaction solution can be controlled in any convenient manner, such as by metering acid or acidic solution into the reaction solution. A wide variety of acids can be employed to control the pH, such as hydrochloric, hydrobromic, trifluoro acetic, trichloro acetic, dichloro acetic, monochloro difluoro acetic, benzene sulfonic, perchloric and hypophosphorous acids. Moderately good results are obtained with phosphorous, phosphoric and hydroiodic acids. Any acid which tends to quench the fluorescence of the phosphor, such as nitric or sulfamic acid, should not be employed. Any acid can be employed which does not quench or substantially reduce the fluorescence of the phosphors when its anion is incorporated in the crystal lattice, and which provides the desired pH range in the reaction solution. Other reaction solutions besides water can be used, such as various organic solvents, when the conditions are regulated to provide a solubility for the lead-activated barium sulfate phosphor substantially equivalent to that of an aqueous acidic solution having a pH of less than 2.0, and preferably less than about 1.0 and containing up to 0.5 molar sulfate ion at 70° to 100° C.

The same conditions described above for the preparation of barium lead sulfate phosphors can be applied in accordance with the invention to the preparation of a variety of other sulfate phosphors, such as barium sulfate activated with various other cations, e.g., any of the rare earth activated barium sulfates, or calcium and manganese activated barium sulfate.

With lanthanide activated barium sulfate phosphors, use of an univalent cation in the reaction mixture in concentrations from about 0.02 to 0.2 molar improves the efficiency of coprecipitation of the lanthanide ion, and quenches chemiluminescence. The preferred univalent cation is ammonium ion, which gives lanthanide-activated barium sulfate phosphors which are not improved by ignition. Sodium ions are also highly useful; lanthanide-activated barium sulfate phosphors which contain sodium ion are improved very slightly by ignition. The use of ammonium or sodium ion is also desirable from the standpoint that it quenches chemiluminescence, which is a disadvantage in certain applications, such as in X-ray intensifying screens. (Other methods can be used to quench chemiluminescence, such as heating to 200° C.). Preferably, the concentration of lanthanide ion in the precipitate is on the order from about 0.25 to 1 percent by weight. Best results are obtained in aqueous acidic reaction solutions by maintaining the pH below about 0.5, and temperatures near 100° C. As indicated before, an excess of sulfate ion is preferably employed in the reaction solutions. The excess sulfate ion can be up to about 1 molar, and preferably is under about 0.5, or even under 0.1 molar, over the amount required to react with the lanthanide ions and barium ions. Good phosphors can be obtained without using the excess sulfate throughout precipitation, but most efficient luminescence is obtained with the excess sulfate. Optimum results are obtained using a rate of addition not exceeding 0.025 mole per minute per liter of reaction solution.

Barium sulfate precipitates can also be activated with divalent lanthanide ions such as europium. These phosphors can be prepared with speeds similar to those obtained with the trivalent lanthanide ions. Mixtures of lanthanide ions can be used in the reaction solutions to obtain phosphors with special properties.

These phosphors are useful in radiographic intensifying screens, cathode ray tubes and lighting devices. The ultraviolet emission from some of these phosphors may be used to initiate photochemical reactions.

Lead sulfate phosphors can be prepared in accordance with this invention using the same reaction conditions described for the preparation of barium lead sulfate. However, best results are obtained using excess lead ions in the reaction solution. Lead sulfate crystals prepared in accordance with this invention are efficiently luminescent, and do not require ignition at high temperatures. Advantageously, ammonium or sodium ions, or other univalent ions, are also used in the reaction solution. Concentrations of univalent cation ranging from 0.019 to 0.075 molar in the reaction mixture result in especially efficient phosphors. Temperatures of 50° C. and higher can be used. The reaction solution is advantageously held at a pH below 1.0. However, phosphors of good, efficient luminescence are obtained when operating within the general ranges and procedures described heretofore.

Lead sulfate phosphors have a fluorescence which may be associated with an ionic impurity in the crystal lattice. Efficiency of luminescence is greater when the lead sulfate is precipitated in the presence of excess lead ion. The nature of this impurity is not known. As noted above, an excess of lead ion is advantageously maintained during the reaction in the reaction solution. Best results are obtained with the use of an excess of 0.5 molar or less lead ions; preferably less than about 0.1 molar excess lead ion is used with a reaction solution having a pH of about 0.25. At that pH, an excess of 0.0375 molar lead ion produces highly useful results. The lead sulfate phosphors prepared in accordance with this invention can be incorporated in a suitable binder to form fluorescent intensifying screens for radiography. The high physical density of these phosphors makes it possible to prepare thinner coatings than can be prepared with various other phosphors, such as barium sulfate phosphors, without decreasing absorption of X-rays.

Phosphors containing fluoride ion, such as the fluorohalides, can be prepared in accordance with the processes of this invention. Typical of such phosphors are the alkaline earth fluorohalides, such as barium fluorochloride. In preparing these phosphors, it is generally desirable to have a slight excess of the cation, i.e., barium, in the reaction solution during the precipitation. Although various salts can be used with good results, barium chloride and ammonium or potassium fluoride provide the best results. Especially good phosphors are obtained when the cations and anions to form the phosphor are introduced at about 0.025 mole per liter of reaction solution per minute. These phosphors are efficiently luminescent, and at the same time have negligible afterglow. Afterglow is highly undesirable when phosphors are employed in X-ray intensifying screens.

Although the speed of these fluoride phosphors is good as removed from the reaction solution (after drying), a substantial increase in speed (i.e., efficiency of luminescence) can be imparted to the phosphors when they are ripened by heating in a suitable solution for a short time, such as from 30 minutes up to several hours. Ripening does not cause appreciable afterglow. The size of the crystals prepared in accordance with the invention is relatively small when compared with those prepared by classical ignition techniques. The longest edges of the crystals are on the order of 10 microns, with most of the crystals being less than 3 microns long. Crystals of ignited fluoride phosphors have edges as long as 40 microns, which is undesirably large when used in X-ray intensifying screens. The ripening step can be conducted at temperatures below the boiling point of the solution, or higher if desired. Advantageously, the temperature used in ripening is less than that temperature which would impart afterglow to the phosphors, such as temperatures below 300° C. Temperatures of 80° to 100° C. are quite suitable for the ripening procedure.

Various tungstate phosphors, exemplified by calcium tungstate, can be prepared advantageously in accordance with procedure of this invention. The following discussion is directed primarily to calcium tungstate phosphors, since they are an important commercial class of tungstate phosphors. However, the methods for preparing calcium tungstate are useful and directly applicable to preparing other tungstate phosphors. Heretofore, calcium tungstate phosphors have been prepared commercially by a procedure which involves ignition. The calcium tungstate crystals formed by the procedure of the invention can be made efficiently luminescent by a short ripening step, or by heating at moderately low temperatures. No ignition is required to obtain efficiently luminescent tungstate phosphors. The efficiency of tungstate phosphors prepared in accordance with the invention is high.

Phosphors containing tungstate anion, such as calcium tungstate, are preferably formed in a basic reaction solution, such as a basic aqueous reaction solution. Any suitable base can be used to regulate the pH, ammonium or sodium hydroxide being highly satisfactory. Preferably, the pH is over 7. The reaction can be suitably conducted with slight excesses of either tungstate or calcium ions in the reaction solution. Good results are obtained with an excess of tungstate or calcium ion up to 0.5 molar, but preferably the excess is less than 0.1 molar.

These calcium tungstate precipitates are highly useful, since they are formed with the proper size distribution to provide efficient fluorescence. Ripening the precipitates, followed, if desired, by heating to moderate temperatures (e.g., below the melting point of glass) results in calcium tungstate phosphors which have efficiency about the same as or higher than that of commercially available calcium tungstate phosphors. The heating step can be very short, since no crystal growth is required. Efficient phosphors of good speed can be obtained by just ripening, without heating. No flux is necessary during the heating step, when that step is used. Heating improves the crystal structure, without substantially increasing the size of the crystals.

Carbonate phosphors, such as alkaline earth, lead and various other heavy metal carbonate phosphors, can be prepared in accordance with this invention. A slight excess of carbonate ion in the reaction solution produces phosphors having the most efficient luminescence. No special aftertreatment is required to obtain good phosphors. Heating the phosphors at moderate temperatures, such as about 100° C., is desirable.

My invention will be further illustrated by the following examples. Examples 1–6 demonstrate the preparation of barium lead sulfate phosphors in accordance with this invention. Tests conducted in these examples establish the efficiency of the luminescence of these phosphors. Contrary to prior art teachings, the efficiency of these phosphors, when prepared by the invention, is not increased upon ignition; rather, ignition decreases their efficiency.

EXAMPLE 1 — BARIUM-LEAD SULFATE

A solution (A) of 0.1 M. barium acetate and 0.02 M. lead acetate is prepared. Another solution (B) of 0.1 M. sodium sulfate is prepared. Five hundred milliliter quantities of solutions A and B are placed in two burets, which are calibrated to deliver 22 ml. of solution per minute. A third solution is prepared by adding 50 ml. of solution B to 200 ml. of 1 N. hydrochloric acid (C). This solution C is heated to 95° C. in a 4-liter beaker and solutions A and B are run into opposite sides of the beaker simultaneously. Solution C is vigorously stirred and heated during the addition of A and B. The precipitate settles rapidly as soon as stirring is stopped. After washing 4 times by decantation and drying, the precipitate is divided into three portions. One portion is mixed with $SiO_2$ and ignited by heating to 1,000° C. for 1 hour. Another is ignited in the same way without $SiO_2$. The third is not ignited. Microscopic examination of the crystals before heating showed that the edges thereof range from 2 to 10 microns in length. After ignition, the materials are placed in cups at a coverage of 1.4–1.5 grams/ 3.6 cm$^2$ and exposed to 70 $KV_p$ X-rays. The emitted light is recorded with an X-ray film having a non-spectrally sensitized coarse grain gelatin silver bromoiodide (2 mole percent iodide) emulsion coated on each side of a cellulose acetate support. The film is placed in contact with the cup containing the phosphor. The exposed film is developed for 5 minutes in Kodak D–19b developer in a tank at 20° C. It is fixed, washed, and dried in the usual manner. The developed densities produced by the three preparations are as follows: unheated precipitate, 2.22; ignited precipitate, 1.91; ignited precipitate with $SiO_2$, 2.13.

EXAMPLE 2 — BARIUM-LEAD SULFATE

A solution (A) of 0.2375 M. barium chloride, 0.0125 M. lead chloride, and 0.0125 M. hydrochloric acid is prepared. A second solution (B) of 0.25 M. sodium sulfate and 0.5 M. hydrochloric acid is also prepared. Five hundred milliliter quantities of both of these solutions are simultaneously added at rates of 22 ml/minute to a vigorously stirred mixture of 200 ml. of 0.5 M. hydrochloric acid and 20 ml. of solution B. The temperature of the third solution is between 80° and 95° C. during the precipitation of the barium lead sulfate. Half of the precipitate is heated to 1,000° C. for 1 hour after washing and drying; the other half is simply washed and dried. When tested exactly as described in Example 1, the ignited material produces a density of 1.5; the precipitated material produces a density of 2.3.

EXAMPLE 3 — BARIUM-LEAD SULFATE

Four liters of solution are prepared by mixing 110 grams (0.1125 M) barium chloride dihydrate, 115 grams (0.1125M) barium acetate, 37.9 grams (0.025 M) lead acetate trihydrate, and 12 ml. (0.069M) glacial acetic acid with sufficient water. A second solution is prepared by mixing 51.6 grams (0.125 M) 95 percent sulfuric acid, 71.0 grams (0.125 M) sodium sulfate, and 97.5 grams (0.25 M) of 37.5 percent hydrochloric acid with sufficient water to make 4 liters. A third solution is placed in a 4-liter beaker. The solution contains 400 ml. of 0.25 M. hydrochloric acid and 50 ml. of the second solution (concentration of sulfate ion in this third solution is approximately 0.028 M), and is maintained at temperatures between 85° and 95° C. during the precipitation. Five-hundred milliliter quantities of the first two solutions are simultaneously added to opposite sides of the beaker at rates of 22 ml. per minute with vigorous stirring. When precipitation is complete, the barium lead sulfate is washed four times by decantation and dried in air. Half of the precipitate is ignited at 1,000° C. for 1 hour; the remainder is kept at room temperature. When tested exactly as described in Example 1, the ignited material, at a coverage of 1.5 gram/3.6 cm$^2$ produces a density of 2.15; the precipitate without subsequent ignition at a coverage of 1.4 gram/3.6 cm$^2$ produces a density of 2.24. The grains of the precipitated material are about 4–6 microns on an edge.

EXAMPLE 4—BARIUM-LEAD SULFATE

Five liters of the first solution and five liters of the second solution in Example 3 are prepared, and heated to 60°–70° C. Four liters of a third solution are placed in a 20-liter flask and heated to 80° C. This solution contains 11.1 g. $Na_2SO_4$, 8.1 g. 95 percent $H_2SO_4$, and 110 g. 37.5 percent HCl (concentration of sulfate ion, 0.039 M). The first two solutions are added to the third with vigorous stirring (i.e., a 2-inch glass stirrer, rotating at 2,000 rpm. in a 20-liter round bottom flask with fluted sides) at a rate of 250 ml/min. The crystals of the precipitate are rectangular parallelopipeds, approximately 2–3 microns on an edge.

Five liter quantities of the first two solutions in the preceding paragraph are prepared and heated to 70° C. Four liters of a third solution which contains 8.88 g. $Na_2SO_4$, 6.45 g. $H_2SO_4$, and 110 g. 37.5 percent HCl are placed in the flask and heated to 90° C. (concentration of sulfate ion, 0.031 M). The first two solutions are added to the third with vigorous stirring at a rate of 250 ml/min. The crystals of the precipitate are rectangular parallelopipeds, approximately 5–8 microns on an edge.

The preparation of the preceding paragraph is repeated, but the volume of the third solution is increased to 5 liters by addition of 0.25 M. HCl. The concentration of sulfate ion is thus decreased to 0.8 of its value in the preceding paragraph. This change in procedure increases the grain size from 5–8 microns to 10–20 microns.

EXAMPLE 5—BARIUM-LEAD SULFATE

A solution (A) of 338 g. barium chloride dihydrate, 45.4 g. lead acetate trihydrate, 9.75 g. 37.5 percent hydrochloric acid and water to make 5 liters is prepared. Another solution (B) of 213 g. anhydrous sodium sulfate, 244 g. 37.5 percent hydrochloric acid, and water to make 5 liters is also prepared. These two solutions are simultaneously added with vigorous stirring (i.e., a 2-inch glass stirrer, rotating at 2,000 rpm. in a 22-liter round bottom flask with fluted sides) at a rate of 250 ml/min to a third solution which is maintained at 90° C. during the precipitation. The third solution contains 4 liters of 0.25 M hydrochloric acid and 400 ml. of solution B. Relatively large rectangular parallelopipeds are produced by this procedure (10 to 25$\mu$ on an edge). After washing by decantation and drying, the precipitate is compared with commercial barium lead sulfate phosphor (presumably prepared by ignition as described in U.S. Pat. No. 2,289,997) at a coverage of 1.5 grams/3.5 cm$^2$, by the test procedure described in Example 1. The precipitated phosphor produces a density of 2.4; the commercial phosphor produces a density of 2.1.

EXAMPLE 6 —BARIUM-LEAD SULFATE

A solution (A) is prepared by mixing 835 ml. of 1.35 M. barium chloride, 125 ml. of 1.0 M. lead acetate and 20 ml. of glacial acetic acid with sufficient water to make 5 liters of solution. A second solution (B) is prepared by mixing 833 ml. of 1.5 M cupric sulfate, 580 ml. of 37.5 percent hydrochloric acid and 835 ml. of 3 M. ammonium chloride with sufficient water to make 5 liters of solution. Solutions (A) and (B) are heated to 70° C. and added to a solution (C) which consists of 100 ml. of 1.5 M. cupric sulfate in sufficient water to make 4 liters of solution, and which has been placed in a fluted 22-liter flask together with 100 ml. of 3 M. ammonium chloride. Just before the start of the reaction, 232 ml. of 37.5 percent hydrochloric acid are added to solution (C), the temperature of which is 95° C. The relative speed of the washed and dried precipitate is 145, compared to a relative speed of 100 for a commercially available barium lead sulfate phosphor (believed to have been prepared by igniting as described in U.S. Pat. No. 2,289,997). The speeds of the phosphors are determined by placing 2 grams of phosphor in a planchet with an area of 4.9 cm$^2$, which gives a coverage of about 0.4 gram per cm$^2$. The planchets are placed in a rack and exposed to 70 kvp. X-rays filtered with one-half mm copper and 1 mm aluminum. The X-ray film described in Example 30 is used to measure the light emitted from the phosphors. The commercial phosphor is assigned a relative speed of 100. Thus, it can be seen that the precipitates of the invention produce nearly a 50 percent increase in speed over commercially available phosphors.

It is apparent from the foregoing examples that the barium lead sulfate phosphors prepared in accordance with my invention have good luminescence. The luminescence of these phosphors is generally at least equal, and frequently superior, to the luminescence of the ignited barium lead sulfate phosphors of the prior art.

Phosphors such as barium-bismuth sulfate and bariumcalcium-manganese sulfate can be prepared by the procedure of the invention, as demonstrated in Examples 7 and 8.

EXAMPLE 7—BARIUM-BISMUTH SULFATE

A 1.425 molar solution of barium chloride dihydrate, and a 1.5 molar solution of sodium sulfate are prepared. The sodium sulfate solution also contains 2.5 moles of hydrochloric acid per liter. One liter of the sodium sulfate stock solution is diluted with water to make 5 liters of reagent solution. In addition, 100 ml. of the stock sulfate solution are added to 4 liters of distilled water and heated to 95° C. in a 22-liter round bottom flask with four equally spaced vertical indentations, 1½ inches deep, in the wall. The solution in the 22-liter flask is agitated with a tubular glass stirrer, 2 inches long with one-half inch inner diameter and three-quarter inch outer diameter, rotating at 1,000–2,000 rpm. When the temperature reaches 95° C., 80 ml. of 37.5 percent hydrochloric acid are added and the reaction is started immediately afterward. The diluted sulfate solution and a diluted solution of barium and bismuth ions are added simultaneously to opposite sides of the 22-liter flask. The diluted barium-bismuth solution contains 1,010 ml. of the barium chloride solution described above and 0.06 mole bismuth trichloride which is dissolved in 60 ml. of 37.5 percent hydrochloric acid. The volume of the diluted solution is 5 liters. Both the dilute sulfate solution and the dilute barium-bismuth solution are heated to 80° C. before starting the precipitation. The time of addition is 20 minutes; the rate of addition is 250 ml/min. The precipitate is washed three times by decantation, filtered, and dried. The dry precipitate is placed in a cup, at a coverage of 0.6 gram per square centimeter, and exposed to 70 k.v.p. X-rays filtered by one-half mm of copper and 1 mm of aluminum. The fluorescence is measured with a film having a coarse grained, panchromatically sensitized gelatin silver bromoiodide emulsion coated on a cellulose triacetate support, developed for 5 minutes in Kodak developer D-19b, at a temperature of 20° C. The speed of the phosphor is 14, relative to a speed of 100 for a commercial barium lead sulfate. The color of the fluorescence is red.

EXAMPLE 8—BARIUM-CALCIUM-MANGANESE SULFATE

Barium and sulfate stock solutions are prepared as in Example 7. The sulfate solution is diluted as described before. The barium solution is prepared by mixing 30 grams of calcium chloride dihydrate and 60 grams manganous chloride dihydrate with 948 ml. of the barium stock solution and water to make 5 liters of solution. The solution in the 22-liter flask is the same as that described in Example 7, except for the addition of 12 grams of manganous chloride dihydrate. The temperatures and rates of addition and agitation are the same as those in Example 7. When the precipitate is irradiated with 30 k.v.p. X-rays, a yellow fluorescence is observed.

It is known that rare earth ions can be used to activate synthetic phosphors; for example, samarium, europium and praseodymium have been used to activate sulfates and other salts of alkaline earth metals. These phosphors were previously prepared by mixing the rare earth sulfate with the alkaline earth sulfate in aqueous solution, evaporating to dryness, grinding with sodium fluoride and igniting for about 5 minutes. In another method, a concentrated solution of barium and samarium nitrate was allowed to react with sulfuric acid and the precipitate was then ignited for 5 minutes.

I have also found that rare-earth activated phosphors, such as barium-samarium sulfate, barium-europium sulfate, and barium-praseodymium sulfate, with good efficiency of fluorescence when excited by X-rays, can be prepared by the procedure of this invention. The preparation of such phosphors is illustrated in Examples 9–20.

EXAMPLE 9—BARIUM-EUROPIUM SULFATE

Barium and sulfate stock solutions are prepared similar to those described in Example 7. The diluted sulfate solution is prepared by using 100 ml. of stock solution and sufficient water to make 500 ml. The barium solution is prepared by using 102 ml. of stock solution, 0.8 gram anhydrous europium trichloride, and sufficient water to make 500 ml. of solution. The solutions are added at a rate of 25 ml/min. to a 4-liter beaker which contains 800 ml. of solution. This solution is prepared by diluting 25 ml. of 37.5 percent hydrochloric acid and 20 ml. of sulfate concentrate with sufficient water to make 800 ml. The temperatures of the solutions are similar to those described in Example 7. The solution in the beaker is agitated with the stirrer of Example 7, rotating at 800 rpm. The precipitate is washed three times by decantation, filtered, dried, and exposed to X-rays as described in Example 7. The relative speed of the phosphor is 34.5, compared with a speed of 100 for the commercial barium lead sulfate phosphor.

EXAMPLE 10—BARIUM-SAMARIUM SULFATE

The procedure of Example 9 is repeated, except 0.8 gram samarium trichloride is substituted for the 0.8 gram of europium trichloride. When the precipitate is irradiated with 25 or 50 kvp. X-rays, a bright orange fluorescence is observed.

EXAMPLE 11—BARIUM-PRASEODYMIUM SULFATE

The procedure of Example 9 is repeated, but 0.8 gram praseodymium chloride is substituted for the 0.8 gram of europium trichloride. When the precipitate is irradiated with 25 or 50 kvp. X-rays, an orange-red fluorescence is observed. The intensity is somewhat less than that of the samarium-doped precipitate of Example 10.

The above Examples 7–11 show that materials which fluoresce efficiently when excited with X-rays are prepared by the process of the invention.

The lanthanide-activated barium sulfate phosphors are preferably prepared at pH below 2.0 in aqueous solution in the presence of alkali metal or ammonium ions, and in the absence of nitrate ion, from soluble barium and lanthanide salts and sulfuric acid. When the rates of addition and the excess of sulfate ion in the reaction solution are controlled in accordance with the invention, the phosphors have especially good efficiency of luminescence when excited by X-rays. The efficiency of fluorescence of the phosphors that contain ammonium ion is not improved by ignition to high temperatures. The efficiency of the phosphors that contain sodium ion is improved to a small extent by ignition. Chemiluminescence of some of these phosphors can be removed by a mild heating such as up to 200° C. These points are illustrated in Examples 12–21.

EXAMPLE 12—BARIUM-EUROPIUM SULFATE

A 1.35 M solution of barium chloride in distilled water is prepared and filtered through a high-purity micropore cellulose ester filter, Type HAWP 04700 Millipore filter (having a pore size of $0.45\mu$). A 0.4 M solution of europium acetate is prepared by mixing 7 grams of europium oxide with 16.8 grams acetic acid and sufficient water to make 100 ml. of solution. This solution is also filtered through a Millipore filter with pore size of $0.45\mu$. The filtration of these solutions removes a substantial amount of insoluble material.

After filtration, 925 ml. of the 1.35 M barium chloride solution are mixed with 15 ml. of the europium acetate solution and sufficient distilled water to make 5 liters of solution (I). A second solution, II, is prepared by mixing 417 ml. of 3 M sulfuric acid (Reagent Grade) with sufficient distilled water to make 5 liters. A third solution, III, is prepared by mixing 50 ml. of the 3 M sulfuric acid and sufficient water to make 4 liters of solution.

Solution III of the preceding paragraph is placed in a 22-liter round bottom flask with four equally spaced vertical indentations, 1½ inches deep, in the wall, and heated to 95° C. Solutions I and II are heated to 70° C. Just before starting the reaction, 80 ml. of 37.5 percent hydrochloric acid solution in water are added to the 22-liter flask and the resulting solution is agitated then and during the reaction with a glass stirrer that has a tubular blade 2 inches long with one-half-inch inner diameter and three-fourths-inch outer diameter, rotating at 1,000–2,000 rpm. in the center and about 1 inch above the bottom of the flask. Solutions I and II are added at the rate of 83 ml. of each per minute to the stirred third solution. At the conclusion of the reaction, the supernatant liquid is poured off and the precipitate is washed four times by decantation with distilled water. The precipitate is then collected on a suction filter and dried at room temperature or at 120° C. in a vacuum oven.

After drying, samples of the precipitate are heated to 300° C. and 1000° C. in a Vycor(leached 96 percent silica glass)crucible in air. The heated and unheated precipitates are then placed in cups at a coverage of 0.6 gram per square centimeter and exposed to 70 kvp. X-rays, filtered by one-half mm of copper and 1 mm of aluminum. The fluorescence is measured with the X-ray film described in Example 30, placed in contact with the cups containing the phosphor. The exposed film is developed for 5 minutes in Kodak developer Db in a tank at 20° C. It is fixed, washed and dried in the usual manner. The developed densities are compared with that produced by commercial lead-activated barium sulfate at the same coverage and the relative speed is determined. The film is also left in contact with the cups of phosphor without exposure to X-rays for 1½ hours, and processed as described above.

The speed of the precipitate dried at room temperature, or at 120° C. in the vacuum oven cannot be measured accurately, because it is affected by chemiluminescence. The speed of the precipitate that is heated to 300° C. is 74; the speed of the precipitate that is heated to 1,000° C. is less than 40. The speed of the commercial lead-activated barium sulfate control is 100.

This example is repeated, but only 5 ml. of 0.4 M. europium acetate solution are used in making solution I instead of the 15 used before, and 5 ml. and 4 ml. of the 0.4 M solution are added to the solutions II and III, respectively. Solutions I and II are added to solution III at a rate of 333 ml. of each per minute.

The speed of this precipitate that is dried at room temperature or at 120° C. in vacuum cannot be measured accurately, because it is affected by chemiluminescence. The speed of the precipitate that is heated to 300° C. is 52; the speed of the precipitate that is heated to 1,000° C. is 25, compared with 100 for the commercial lead-activated barium sulfate. The heated precipitates are not chemiluminescent.

The results in Example 12 show that the speeds of the europium-activated phosphors prepared in the absence of ammonium or alkali metal cations decrease when they are ignited to high temperatures. When the precipitates are not heated, they are chemiluminescent and fog photographic film that is placed in contact with them.

Example 13—BARIUM-EUROPIUM SULFATE, WITH AMMONIUM ION

Example 12 is repeated, with the exception that 300 ml. of 3 M ammonium chloride and 120 ml. of 3 M ammonium chloride are added to solutions II and III, respectively.

The relative speed of the precipitate prepared with all of the europium ion in solution I and with a slow rate of addition is 144. After heating to 1,000° C. for 1 hour, the speed is less than 10. The relative speed of the precipitate prepared with europium ion in all three solutions and with a rate of addition of 333 ml./min. is 86. After heating to 1,000° C. for 1 hour, the relative speed is only 22. No chemiluminescence is observed with either precipitate. This example shows that ammonium ion quenches chemiluminescence, and that ignition of precipitates prepared with ammonium ion decreases the speed substantially.

EXAMPLE 14—BARIUM-EUROPIUM SULFATE, WITH SODIUM ION

Example 13 is repeated, but sodium chloride solution is used instead of ammonium chloride in solutions II and III.

The relative speed of the precipitate prepared with all of the europium ion in solution I, and with a slow rate of addition, is 120; after heating to 1,000° C. for 1 hour, the speed is 155. The relative speed of the precipitate prepared with europium ion in all three solutions and with a rate of addition of 333 ml./min. is 85; after heating to 1,000° C. for 1 hour, the speed is 115. No chemiluminescence is observed with either precipitate.

Thus, sodium ion quenches chemiluminescence, and precipitates prepared with sodium ion in the reagents and the reaction solution have moderately increased speed after ignition to 1,000° C.

EXAMPLE 15—BARIUM-CERIUM SULFATE, WITH AMMONIUM ION

A 1.04 M solution of barium chloride in distilled water is prepared and filtered through a Type HAWP 04700 Millipore filter with pore size of 0.45 $\mu$. A 0.4 M solution of cerium trichloride is prepared by mixing 9.9 grams cerous chloride (99.9 percent anhydrous) with sufficient water to make 100 ml. of solution. This solution is also filtered through the Millipore filter.

After filtration, 1,200 ml. of the 1.04 M barium chloride solution are mixed with 15 ml. of the cerous chloride solution and sufficient distilled water to make 5 liters. (Solution I) Solution II is prepared by mixing 417 ml. of 3 M sulfuric acid and 300 ml. of ammonium chloride with sufficient water to make 5 liters. Solution III is prepared by mixing 50 ml. of the sulfuric acid solution, 120 ml. of the 3 M ammonium chloride solution, and sufficient water to make 4 liters.

Solution III is placed in the 22-liter flask as described in Example 12, and the precipitation is performed as described in that example. The dried precipitate is tested as described in Example 1, and has a relative speed of 43, compared with 100 for the lead-activated barium sulfate control. The measurement of this speed is affected to some extent by the short wavelength of the radiation emitted by the cerium-activated phosphor (The maximum intensity is in the region between 300 and 330 nm, compared with 375 nm. for the lead-activated barium sulfate). Thus, some of the radiation is absorbed by the protective colloid of the photographic emulsion used to measure the speed, and the distribution of absorption in the emulsion layer differs from that obtained with lead-activated barium sulfate. Both of these effects would cause an apparent decrease in the speed relative to that of the lead-activated barium sulfate.

This example is repeated, but only 5 ml. of the 0.4 M cerous chloride solution are used in making solution I instead of the 15 used before, and 5 ml. and 4 ml. of the 0.4 M solution are added to solutions II and III, respectively. Solutions I and II are added to solution III at a rate of 333 ml. of each per minute. The relative speed of the dried precipitate is 43 in this case also. A commercial calcium tungstate phosphor tested in the same way has a relative speed of 43.

The results of this example show that the speeds of cerium-activated barium sulfate phosphors, prepared by the procedures of the invention, are at least as high as that of calcium tungstate. When these $BaSO_4$:Ce phosphors are heated to 300° C. in Vycor crucibles for 1 hour, the speeds decrease to 13–15. When they are heated (ignited) to 1,000° C., the speeds are negligible.

EXAMPLE 16—BARIUM-CERIUM SULFATE, WITH SODIUM ION

Example 15 is repeated, but sodium chloride is used instead of ammonium chloride. The relative speeds of the two precipitates without ignition are 22 and 21, respectively. The speeds decrease to 11–13 after heating to 300° C., and to zero after ignition to 1,000° C.

Thus, cerium-activated barium sulfate phosphors, prepared by the invention and in the presence of ammonium or sodium cations, are not improved by ignition to high temperatures.

EXAMPLE 17—BARIUM-GADOLINIUM SULFATE

A 1.04 M solution of barium chloride in water is prepared as described in Example 15; a 0.4 M solution of gadolinium trichloride is prepared by mixing 10.5 grams 99.0 percent gadolinium trichloride with sufficient water to make 100 ml. followed by filtering with the Millipore filter. After filtration, 1,200 ml. of the 1.04 M barium chloride solution are mixed with 15 ml. of the gadolinium trichloride solution and sufficient water to make 5 liters, (Solution I), Solution II is prepared by mixing 417 ml. of 3 M sulfuric acid and 300 ml. of 3 M ammonium chloride with sufficient water to make 5 liters. Solution III is prepared by mixing 120 ml. of 3 M ammonium chloride and 50 ml. of 3 M sulfuric acid with sufficient water to make 4 liters. Solution III is heated to 95° C. in the 22-liter round bottom flask described in Example 12 and solutions I and II are heated to 70° C. Just before starting the reaction, 70 ml. of 37.5 percent hydrochloric acid are added to the 22-liter flask and the resulting solution is agitated then and during the reaction as described in Example 12. Solutions I and II are added at a rate of 83 ml. of each per minute to the stirred solution III. At the conclusion of the reaction, the precipitate is washed, collected, and dried as described in Example 12. After drying, the relative speed of the precipitate is 41, compared with 43 for commercial calcium tungstate and 100 for commercial lead-activated barium sulfate.

The experiment is repeated, but sodium chloride is substituted for ammonium chloride in solutions II and III. The dry precipitate has a speed of 43, compared with 43 for commercial calcium tungstate.

When these gadolinium-activated barium sulfate phosphors are heated in air to 300° C. or ignited at 1,000° C., the speed decreases to zero when the phosphor is coactivated with ammonium ion and to a lesser extent when the phosphor is coactivated with sodium ion.

EXAMPLE 18—BARIUM-TERBIUM SULFATE

A 1.35 M solution of barium chloride in distilled water is prepared as described in Example 1. A 0.4 M solution of terbium chloride is also prepared by dissolving anhydrous terbium chloride (99.9 percent) in sufficient water, followed by filtration through the Millipore filter.

After filtration, 925 ml. of the 1.35 M barium chloride solution are mixed with 15 ml. of the terbium chloride solution and sufficient water to make 5 liters of solution I. Solution II is prepared by mixing 417 ml. of 3 M sulfuric acid (Reagent Grade) with sufficient distilled water to make 5 liters. Solution III is prepared by mixing 50 ml. of the 3 M sulfuric acid, 120 ml. of 3 M ammonium chloride, and sufficient water to make 4 liters of solution.

Seventy ml. of 37.5 percent hydrochloric acid are added to solution III after it has been heated to 95° C. and then the three solutions are mixed as described in the third paragraph of Example 12. The precipitate is washed, and dried as described in that example. It has efficient fluorescence.

This example is repeated, but sodium chloride is used instead of ammonium chloride. It is efficiently luminescent.

The two procedures described above are repeated, but only 5 ml. of the 0.4 M terbium chloride are used in making solution I instead of the 15 used before, and 5 ml. of the 0.4 M solution are added to solutions II and III, respectively. The procedure for precipitation is similar to that used before, but the solutions I and II are added to solution III at a rate of 333 ml. of each per minute. When the dried precipitates are tested, the speed of the precipitate prepared with ammonium ion is slightly slower than the speed of the one prepared with sodium ion.

When these phosphors are ignited to 1,000° C. for 1 hour, the speeds of the phosphors that contain ammonium ion decrease to zero. The speeds of those made with sodium ion decrease to about 75 percent of their original values.

The phosphors prepared by this method have speeds that compare favorably with the commercial phosphors such as calcium tungstate, and they are not improved by ignition to 1,000° C.

EXAMPLE 19—BARIUM-SAMARIUM SULFATE

A 1.35 M solution of barium chloride in water is prepared as described in Example 12. After filtration, 1,063 ml. are mixed with 0.5 gram of anhydrous samarium chloride and sufficient water to make 5 liters of solution I. Solution II is prepared by mixing 478 ml. of 3 M sulfuric acid, 0.5 gram of samarium chloride, 125 ml. of 3 M sodium chloride, and sufficient water to make 5 liters of solution. Solution III is prepared by mixing 50 ml. of 3 M sulfuric acid, 0.4 gram of samarium chloride, 50 ml. of 3 M sodium chloride and sufficient water to make 4 liters of solution. Solutions I and II are heated to 70° C, solution III is heated to 95° C. Just before starting the reaction, 80 ml. of 37.5 percent hydrochloric acid are added to solution III and then solutions I and II are added to solution III at a rate of 333 ml. of each per minute as described in Example 1. The precipitate is washed and dried as described in that example. It is efficiently luminescent.

EXAMPLE 10—BARIUM-SAMARIUM SULFATE

A 1.35 M solution of barium chloride is prepared as in Example 12. After filtration, 925 ml. are mixed with 15 ml. of 0.4 M samarium acetate solution and sufficient water to make 5 liters of solution I. The samarium acetate solution is prepared by mixing 7.0 grams samarium oxide with 14.4 grams acetic acid and sufficient water to make 100 ml., followed by filtration with a Millipore filter as described before. Another solution, II, is prepared by mixing 417 ml. of 3 M sulfuric acid and 300 ml. of 3 M sodium chloride solution with sufficient water to make 5 liters. Finally, solution III is prepared by mixing 50 ml. of 3 M sulfuric acid and 120 ml. of 3 M sodium chloride solution with sufficient water to make 4 liters. After heating solution III to 95° C. in the 22-liter flask and heating solutions I and II to 70° C., 70 ml. of 37.5 percent hydrochloric acid are added to solution III and then solutions I and II are added at a rate of 83 ml. of each per minute, as described in Example 1. The precipitate is washed and dried as described in that example. It is efficiently luminescent.

In a variation of this example, 326 grams of Reagent Grade barium nitrate are dissolved in distilled water and filtered. Then 15 ml. of 0.4 M samarium acetate solutionare added and sufficient water to make 5 liters of solution I. Another solution, II, is prepared by mixing 417 ml. of 3 M sulfuric acid and 300 ml. of 3 M sodium nitrate with sufficient water to make 5 liters. A third solution, III, is prepared by mixing 50 ml. of 3 M sulfuric acid 120 ml. of 3 M sodium nitrate solution, and sufficient water to make 4 liters. Solutions I and II are heated to 70° C; solution III is heated to 95° C. Then 54 ml. of 71 percent nitric acid are added to solution III and solutions I and II are added at a rate of 83 ml. of each per minute, as described in Example 12. The precipitate is washed and dried as described in that example. After drying, the speed of the precipitate is zero.

Thus, the above example shows that nitrate ion quenches the fluorescence of samarium-activated phosphor. Similar procedures used to make other lanthanide-activated phosphors show that nitrate ion in the reaction solution quenches fluorescence.

Using the procedure described in the above Examples 7–20, a wide variety of phosphors having efficient luminescence are prepared, such as rare-earth, (e.g., samarium) activated calcium sulfate, strontium sulfate, and lead sulfate phosphors. Most of the lanthanide ions can be used as activators in the above examples, to obtain phosphors which are effectively luminescent. Mixtures of lanthanide ions can be used as activators to obtain phosphors of special properties.

Especially good results are obtained when the lanthanide-activated phosphors contain a concentration of lanthanide ion of about 0.25 to 1 percent. The precipitate preferably is prepared with vigorous agitation at a pH below 0.5 and at temperatures near 100° C., in the absence of nitrate ion and in the presence of excess sulfate ion, and with the rate of addition of the reagents not exceeding 0.025 mole/min/liter of reaction solution. Generally speaking, the results are better when the excess of sulfate ion is low and the concentration of acid is also below 1 normal. However, phosphors which are efficiently luminescent can be obtained using the broader ranges given above.

Some rare earth activated phosphors prepared in the absence of alkali metal, ammonium, or nitrate ions are chemiluminescent. This chemiluminescence is quenched by the addition of sodium or ammonium ion without decreasing the speed obtained with excitation by X-rays.

It is also possible to prepare phosphors by the method of the invention with divalent lanthanide ions such as europium. The speeds of these phosphors are similar to those obtained with the trivalent lanthanide ions.

Although the phosphors which contain the univalent cations are the easiest to prepare, the precipitates that are prepared without these cations are also useful in radiographic screens if they are heated to moderate temperatures, such as 200°–300° C. to remove the chemiluminescence.

The rare earth activated phosphors are useful in radiographic intensifying screens, in cathode ray tubes, and in lighting devices. The ultraviolet emission from some of the phosphors can be used to initate photochemical reactions.

The preparation of lead sulfate phosphors by the method of the invention is illustrated in Examples 21–28.

EXAMPLE 21—LEAD SULFATE

A 1.0 M solution of lead acetate is prepared by the following procedure: 480 grams of glacial acetic acid are placed in a reaction vessel with a capacity of 2 liters. The acid is agitated with a glass or fluorocarbon polymer-coated stirrer. Then, 447 grams of "fume" grade litharge (Evans Lead Company) are slowly added with stirring. When the solution becomes clear, an equal volume of distilled water is added and the solution is filtered through a Millipore filter (HAWP 04700 with pore size of 0.45 $\mu$ ). This filtration effectively removes small particles of dirt and dust which contain appreciable amounts of iron. After filtration, the solution is diluted to 2 liters with distilled water.

In preparing the lead sulfate, 1,250 ml. of this 1.0 M solution are diluted to 5 liters with distilled water. Another solution is prepared by mixing 417 ml.of 3 M Reagent Grade Sulfuric Acid, 250 ml. of 3 M ammonium trifluoroacetate, and sufficient distilled water to make 5 liters. A third solution is prepared by mixing 100 ml. of 3 M ammonium trifluoroacetate, 50 ml. of 3 M sulfuric acid, and sufficient distilled water to make 4 liters of solution. The third solution is heated to its boiling point in a 22-liter round bottom flask with four equally spaced vertical indentations, 1½ inches deep, in the wall. During the reaction, the solution is agitated with a glass stirrer that has a tubular blade, 2 inches long, with one-half inch inner diameter and three-fourths inch outer diameter, rotating at 1,000–2,000 rpm. in the center and about 1 inch above the bottom of the flask. The first two solutions are preheated to 70° C. Just before starting the reaction, 80 grams of trifluoroacetic acid are added to the 22-liter flask. Then the first two solutions are added simultaneously to the third solution at a rate of 333 ml. of each per minute.

At the conclusion of the reaction, the supernatant liquid is poured off and the precipitate is washed four times by decantation with cold distilled water. The precipitate is then collected on a suction filter and dried at 120° C. in a vacuum oven.

A similar precipitate is prepared by the same procedure, but the ammonium trifluoroacetate is omitted from the second and third solutions.

The dry precipitates are placed in cups at a coverage of 0.8 gram per square centimeter, and exposed to 70 kvp. X-rays, filtered by one-half mm of copper and 1 mm of aluminum. The fluorescence is measured with the X-ray film described in Example 30, placed in contact with the cups containing the phosphor. The exposed film is developed for 5 minutes in Kodak developer D–19b in a tank at 20° C. It is fixed, washed and dried in the usual manner. The developed densities are compared with that produced by commercial lead-activated barium sulfate at the same coverage, and the relative speed is determined. The sample prepared with the ammonium ion has a speed of 13. The speed of the sample prepared without ammonium ion is less than 5.

EXAMPLE 22—LEAD SULFATE

A 1.0 M solution of lead acetate is prepared as described in Example 21, then 1,250 ml. of this solution are diluted to 5 liters with distilled water and heated to 70° C. A second solution is prepared by mixing 417 ml. of 3 M sulfuric acid, 63 grams of 70 percent Reagent Grade nitric acid, and 125 ml. of 1.5 M ammonium nitrate with sufficient water to make 5 liters. This solution is also heated to 70° C. A third solution is prepared by mixing 50 ml. of 3 M sulfuric acid and 50 ml. of 1.5 M ammonium nitrate with sufficient water to make 4 liters. This solution is heated to its boiling point and 44 grams of 70 percent nitric acid are added before starting the reaction in the 22-liter Pyrex flask described in Example 21. Then the first two solutions are added simultaneously at 333 ml/min. to the third solution, as described in Example 21.

At the conclusion of the reaction, the supernatant liquid is poured off and the precipitate is washed four times by decantation with distilled water. The precipitate is then collected on a suction filter and dried at 120° C. in a vacuum oven.

A similar precipitate is prepared by the same procedure, but ammonium nitrate is omitted from the second and third solutions.

The dry precipitates are compared with lead-activated barium sulfate as described in Example 21. The sample with ammonium ion has a speed of 8–10; the sample without ammonium ion has a speed of less than 5.

A similar comparison is made between precipitates prepared in the presence and absence of sodium nitrate. The precipitate with sodium ion has a speed less than 5, the precipitate without sodium ion also has speed less than 5. Thus, the precipitates prepared in the presence of sulfate ion have low speed.

EXAMPLE 23—LEAD SULFATE

A solution is prepared by mixing 1,250 ml. of the 1.0 M lead acetate solution with 250 grams of trifluoroacetic acid and sufficient distilled water to make five liters. This solution is heated to 70° C. A second solution is prepared by mixing 480 ml. of 3 M sulfuric acid with enough water to make 5 liters, and this solution is also heated to 70° C. A third solution is prepared by mixing 50 ml. of 3 M sulfuric acid with enough water to make 4 liters. This solution is heated to the boiling point in the 22-liter flask of Example 1 and 103 grams trifluoroacetic acid are added. Then the first two solutions are added simultaneously at 333 ml/min. to the third solution as described in Example 21.

This preparation is repeated, but the second and third solutions are modified by the addition of 250 and 100 ml. of 3 M ammonium trifluoroacetate, respectively. The precipitates from the two experiments are washed four times by decantation with distilled water and are then collected and dried in the vacuum oven.

The preparation is repeated again with sodium trifluoroacetate instead of ammonium trifluoroacetate in the second and third solutions.

The precipitates are washed four times by decantation with distilled water and are collected and dried in the vacuum oven at 120° C.

When the dry precipitates are compared with lead-activated barium sulfate, as described in Example 21, the sample with sodium ion has a speed of 18, the sample with ammonium ion has a speed of 14, and the sample with no univalent cation has no detectable speed.

EXAMPLE 24—LEAD SULFATE

A solution is prepared by mixing 1,250 ml. of the 1.0 M lead acetate with sufficient water to make 5 liters. This solution is heated to 70° C. A second solution is prepared by mixing 417 ml. of 3 M sulfuric acid, 125 ml. of 1.5 M sodium perchlorate, and 100 grams of perchloric acid (70 percent, A.C.S. Reagent Grade) with sufficient water to make 5 liters, and this solution is also heated to 70° C. A third solution is prepared by mixing 50 ml. of 3 M sulfuric acid and 50 ml. of 1.5 M sodium perchlorate with sufficient water to make 4 liters. This solution is heated to the boiling point in the 22-liter flask of Example 21 and 70 grams of 70 percent perchloric acid are added. The first two solutions are then added simultaneously to the third solution at a rate of 333 ml/min. as described in Example 1 . The precipitate is washed four times by decantation with distilled water, collected on a suction funnel, and dried in the vacuum oven at 120° C.

This example is repeated with ammonium perchlorate instead of sodium perchlorate in the second and third solutions. It is also repeated without any ammonium or sodium ion in these solutions.

The dry precipitates are compared with lead activated barium sulfate, as described in Example 21. The sample with sodium ion has a speed of 12–15, the sample with ammonium ion has a speed of 15, and the sample with no sodium or ammonium ion has a speed of 7.

The above examples show that the presence of sodium or ammonium ion in the reaction mixture increases the speed of these lead sulfate phosphors, prepared by the invention and in the absence of nitrate ion. Additional preparations show that the results are not very sensitive to the concentrations of sodium or ammonium ion; good speeds are obtained with concentrations ranging from 0.019 to 0.075 M in the reaction mixture.

EXAMPLE 25—LEAD SULFATE

A solution is prepared by mixing 1,250 ml. of the 1.0 M lead acetate with sufficient water to make 5 liters. This solution is heated to 70° C. A second solution is prepared by mixing 417 ml. of 3 M sulfuric acid with enough water to make 5 liters, and this solution is also heated to 70° C. A third solution is prepared by mixing 150 ml. of 1.0 M lead acetate solution with sufficient water to make 4 liters. The third solution is placed in the 22-liter flask of Example 21 and heated to the boiling point. At this time, 100 grams of trifluoroacetic acid are added and the first two solutions are added simultaneously at a rate of 333 ml/min. to the third solution which is stirred as described in Example 21. The precipitate is collected, and dried as before.

This procedure is repeated, but the second and third solutions are modified by the addition of 187.5 ml. and 75 ml. of 2 M sodium trifluoroacetic solution in water, respectively. The volumes of the modified solutions are still five liters and four liters, respectively.

The procedure is repeated again with second and third solutions modified by the addition of 125 ml. and 50 ml., respectively, of 3 M ammonium trifluoroacetate solution instead of the sodium trifluoroacetate solution.

The dry precipitates are compared with lead-activated barium sulfate as described in Example 21. The sample with sodium ion has a speed of 33, the sample with ammonium ion has a speed of 31, compared with a speed of 100 for the lead-activated barium sulfate. When neither sodium nor ammonium ions are present, the speed of the precipitate is 18.

The sizes of the crystals in these precipitates are usually less than 10 microns, they are not greatly affected by the differences in the concentration of any univalent cation employed, such as sodium or ammonium ion.

When the procedure is repeated with the same amounts of sodium trifluoroacetate in the second and third solution, with 50 ml. of 3 M sulfuric acid instead of 150 ml. of lead acetate in the third solution, and with only 80 grams of trifluoroacetic acid added to the third solution, the speed is 22.5. When no sodium is present in the reagent or reaction solutions the speed is 8.

The procedures of this example show that the speed of the lead sulfate precipitates is greater when they are prepared in the presence of excess lead ion. Similar results are obtained with perchloric acid and perchlorates, instead of trifluoroacetic acid and trifluoroacetates. Again, the speeds are rather insensitive to the concentration of sodium or ammonium ion in the solutions (good results are obtained with concentrations in the range from 0.02 molar to 0.15 molar) and precipitation in the presence of excess lead ion produces higher speeds than precipitation in the presence of excess sulfate ion. Ammonium ion produces somewhat better results than sodium ion when perchlorates and perchloric acid are used, and when the precipitate is formed in the presence of excess lead ion.

EXAMPLE 26—LEAD SULFATE

A solution is prepared by mixing 1,250 ml. of 1.0 M lead nitrate with sufficient water to make 5 liters. This solution is heated to 70° C. A second solution is prepared by mixing 417 ml. of 3 M sulfuric acid, 250 ml. of 1.5 M sodium nitrate, and sufficient distilled water to make 5 liters. Both of these solutions are heated to 70° C. A third solution is prepared by mixing 150 ml. of 1.0 M lead nitrate and 100 ml. of 1.5 M sodium nitrate with sufficient water to make 4 liters. After heating this solution in the 22-liter flask to the boiling point, 60 grams of 70 percent nitric acid are added and then the first and second solutions are added at 333 ml./min. with stirring, in the manner described before. The precipitate is collected, dried, and tested as described in Example 21.

The procedure is repeated, but ammonium nitrate is used instead of sodium nitrate. It is also repeated without ammonium nitrate or sodium nitrate. Finally, the experiment is repeated with ammonium nitrate in the second and third solutions but with 50 ml. of 3 M sulfuric acid in the third solution instead of 150 ml. of 1.0 M lead nitrate. Reagent Grade chemicals are used in all of these procedures.

The comparison of the speeds of these dry precipitates with that of lead-activated barium sulfate shows that the sample made with ammonium nitrate and excess sulfate ion has a speed of about 7, compared with 100 for the lead-activated barium sulfate. The samples made with excess lead nitrate had no detectable speed. Thus, nitrate ion in large quantities quenches the luminescence of these precipitates and has a greater effect when they are made in the presence of excess lead ion.

When the precipitate that is made in the presence of an excess of lead nitrate and in the presence of sodium nitrate is heated to 900° C. for two hours in a Corning Vycor crucible, the speed increases from zero to 19.

EXAMPLE 27—LEAD SULFATE

A solution is prepared by mixing 1,250 ml. of 1.0 M lead acetate with sufficient distilled water to make 5 liters. This solution is heated to 70° C. A second solution is prepared by mixing 417 ml. of 3 M sulfuric acid, 247.5 ml. of 2 M sodium trifluoroacetate, and sufficient distilled water to make 5 liters. This solution is also heated to 70° C. A third solution is prepared by mixing 50 ml. of 3 M sulfuric acid and 75 ml. of 2 M sodium trifluoroacetate with sufficient distilled water to make 4 liters. This solution is heated to 95° C. in the 22-liter flask, then 120 grams of trifluoroacetic acid are added and the first and second solutions are added with vigorous stirring at 333 ml/min. in the manner described before. The precipitate is collected, dried, and tested as described in Example 21. A portion of the precipitate is then ignited in air to 900° C. for 2 hours in a Vycor crucible. After cooling, the ignited precipitate is tested as described in Example 21.

This preparation is repeated, but 500 ml. of 1.5 M ammonium perchlorate are substituted for the 247.5 ml. of 2 M sodium trifluoroacetate in the second solution and 200 ml. of 1.5 M ammonium perchlorate solution are substituted for the 75 ml. of 2 M sodium trifluoroacetate in the third solution. Seventy grams of perchloric acid (70 percent) are substituted for the 120 grams of trifluoroacetic acid that are added before starting the reaction, and an additional 100 grams of perchloric acid are added to the second solution before dilution to 5 liters.

The preparation of this example is repeated as described in the second paragraph, but 250 ml. and 100 ml. of 1.5 M sodium perchlorate solution are used instead of the 500 ml. and 200 ml. of 1.5 M ammonium perchlorate solution.

Before ignition, the precipitate made as described in the first paragraph has a speed of 19.5; after ignition the speed is 17.5. Before ignition, the precipitate made as described in the second paragraph has a speed of 13.8; after ignition the speed is 13.2. Before ignition, the precipitate made as described in the third paragraph has a speed of 18.6; after ignition the speed is 15.2.

Tests of other precipitates formed in like manner with perchlorates or trifluoroacetates show that the speed of these lead sulfate phosphors remains the same or decreases when the precipitates are ignited.

The intensification factors of ignited precipitates are measured in the manner described by Renwick in U.S. Pat. No. 2,289,384, issued July 14, 1942. Since a detailed method of precipitation is not given in that patent, various methods of precipitation are tested and compared with the results reported by Renwick. The comparisons are shown in the following comparative examples.

EXAMPLE 28—LEAD SULFATE (COMPARATIVE)

A solution is prepared by mixing 1,250 ml. of 1.0 M lead acetate with sufficient water to make 5 liters. This solution is heated to 70° C. A second solution is prepared by mixing 417 ml. of 3 M sulfuric acid with 63 grams of 70 percent nitric acid and sufficient distilled water to make 5 liters. This solution is also heated to 70° C. A third solution is prepared by mixing 50 ml. of 3 M sulfuric acid with sufficient water to make 4 liters. This solution is heated to 95° C. In the 22-liter flask, then 44 grams of 70 percent nitric acid are added and the first and second solutions are added with vigorous stirring at rates of 333 ml/min. in the manner described before. The precipitate is collected, dried, and tested as described in U.S. Pat. No. 2,289,384. A portion of the precipitate is then ignited in air to 900° C. for 2 hours in a Vycor crucible. After cooling, the ignited precipitate is tested in the manner described in U.S. Pat. No. 2,289,384. The intensification factor of the precipitate is 8.3; the intensification factor of the ignited precipitate is 42. Thus, this precipitate behaved in the manner reported in U.S. Pat. No. 2,289,384. The speed of the precipitate before ignition, measured in the way described in Example 21, is less than 5. Consequently, many of the precipitates described herein have greater intensification factors when excited with X-rays than the ignited precipitates described in U.S. Pat. No. 2,289,384.

Example 29—LEAD SULFATE (COMPARATIVE)

Five liters of dilute lead acetate solution are prepared as described in Example 28 and are heated to 70° C. A second solution is prepared by mixing 417 ml. of 3 M sulfuric acid with 125 ml. of 3 M ammonium trifluoroacetate and sufficient distilled water to make five liters. This solution is also heated to 70° C. A third solution is prepared by mixing 150 ml. of 1.0 M lead acetate solution, and 50 ml. of 3 M ammonium trifluoroactate solution with sufficient distilled water to make 4 liters of dilute solution. This solution is heated to 95° C. in the 22-liter flask described before, 100 grams of trifluoroacetic acid are added, and then the first and second solutions are added simultaneously at 333 ml/min. The precipitate is collected and dried as described before. Then a portion is ignited to 900° C. for 2 hours as described before. When tested by the method of U.S. Pat. No. 2,289,384, the intensification factor of the precipitate is 80; the intensification factor of the ignited precipitate is only 25. Similar results are obtained with other preparations made from perchlorates and perchloric acid instead of trifluoroacetates and trifluoroacetic acid. The intensification factor remains the same or decreases when the precipitates are ignited.

The above examples show that precipitates prepared in the presence of nitrate ion closely resemble those described in U.S. Pat. No. 2,289,384. However, precipitates prepared in the absence of nitrate ion, in accordance with the present invention have greater intensification factors than those reported by U.S. Pat. No. 2,289,394, and do not require ignition to 900° C. to make them efficiently luminescent.

The emission spectra of the above precipitated lead sulfate phosphors, when excited by X-rays, are all very similar. The maximum emission occurs at 360–370 nm. and the spectrum extends from 290 to 500 nm. The emission spectrum is not affected by the nature of the univalent ion coactivator, or by the presence of sulfate or lead ion excess during the precipitation. However, the intensity of the emission varies, as described in the preceding examples.

As shown in the above examples, perchlorates, acetates, and trifluoroacetates can be used to make efficient lead sulfate phosphors. Especially good results are obtained with concentrations of sodium or ammonium ion ranging from 0.019 to 0.075 M in the reaction mixture, and with temperatures above 50° C. and with pH below 1.0. The excess of lead ion which produces the best results seems to be about 0.0375 M when the pH is about 0.25. Broader ranges given above can be employed however, with good results. The rates of addition of the reagents are similar to those used in making lead-activated barium sulfate.

The fluorescence of lead sulfate may be associated with an anionic impurity in the crystal lattice, because the efficiency is generally greater than the lead sulfate is precipitated in the presence of excess lead ion. The nature of this impurity is not known at present. The phenomena observed when nitrate ion is present in the solution seem to be caused by quenching of the fluorescence by nitrate ion incorporated in the precipitate. The lower speeds observed when lead sulfate was precipitated in the absence of univalent cations (not hydrogen ion) and in the presence of excess sulfate ion might be explained by inefficient coprecipitation of the anionic activator.

As noted above, phosphors containing fluoride ion, exemplified by barium fluorochloride, can be prepared by the procedure of the invention. The fluorescence of barium fluorochloride was discovered by H. Dietz in 1932. However, the large grain size and apparently irreducible afterglow precluded its use in medical intensifying screens. The preparation and properties of this material are described in the literature. Generally speaking, the method of preparation is rather complicated; at least one and preferably two firings at temperatures above 1,000° F. are needed and it is necessary to remove the flux by washing. This invention provides a convenient method for the preparation of barium fluorochloride phosphors that are efficiently luminescent and which do not exhibit afterglow. The preparation of such phosphors is demonstrated in Examples 30–34.

EXAMPLE 30—BARIUM FLUOROCHLORIDE

A 1.35 M solution of barium chloride is prepared with distilled water, and filtered through a Type HAWP Millipore Filter with 0.45$\mu$ pores. The resulting solution is mixed with one liter of 2.5 M guanidine hydrochloride solution in water which has been filtered in a similar way, and with sufficient water to make 5 liters of solution (A). Another solution (B) is prepared by mixing 38.2 grams of 2 aminoethanol and 50.5 grams of hydrofluoric acid (49.5 percent) with sufficient water to make 5 liters. A third solution (C) is prepared by mixing 111 ml. of the 1.35 M barium chloride solution and 240 ml. of the 2.5 M guanidine hydrochloride solution with sufficient water to make 4 liters of solution.

Solution C is placed in a fluted 22-liter flask as described in Example 7, and is stirred vigorously in the manner described in that example. Solutions A and B are then added simultaneously to solution C at a rate of 250 ml. of each per minute. The temperature of reaction is 23° C. The precipitate is immediately washed four times by decanta-tion with distilled water, collected, and dried in air. After drying, the precipitate is placed in a cup at a coverage of 0.4 gram per square centimeter and exposed to 70 kvp. X-rays filtered with one-half mm. of copper and 1 mm. of aluminum. An X-ray film comprising a cellulose triacetate support having coated on one side thereof a non-spectrally sensitized coarse grain silver bromoiodide (2 mole percent I) emulsion is used to measure the radiation emitted by the phosphor. It is developed in Kodak developer D19$b$ for 5 minutes at 68° F. The developed density produced by the emitted radiation is compared with produced by a similar sample of commercial lead-activated barium sulfate. The speed of this phosphor is set equal to 100. Thus, a speed of 50 for the precipitate means that during irradiation with X-rays, it produces half the density that is produced by the commercial lead-activated barium sulfate.

When the dried precipitate is compared with lead-activated barium sulfate in this manner, the speed is 14, and no afterglow is observed. The maximum size of the crystals of the precipitate is less than about 25 microns and most of the crystals are smaller than this.

EXAMPLE 31—BARIUM FLUOROCHLORIDE

The 1.35 M solution of barium chloride described in Example 30 is mixed with sufficient water to make 5 liters of 0.25 M solution (A). A second solution (B) is prepared by mixing 0.625 mole of ammonium hydrogen fluoride with 0.625 mole of ammonia and sufficient distilled water to make 5 liters. A third solution (C) is prepared by mixing 0.150 mole barium chloride and 0.6 mole ammonium chloride with sufficient water to make 4 liters.

Solution C is placed in a fluted 22-liter flask similar to that used in Example 7, and is stirred vigorously. Then solution A and B are added at a rate of 250 ml. of each per minute. The temperature of reaction is 23° C. The precipitate is immediately washed, collected, and dried. When the fluorescence, excited by 70 kvp. X-rays, is measured as described in Example 30, a speed of 14.5 is obtained. No afterglow is observed, and the crystals are smaller than 20 microns.

EXAMPLE 32—BARIUM FLUOROCHLORIDE

The 1.35 M solution of barium described in Example 30 is mixed with sufficient water to make 5 liters of 0.25 M solution (A). A second solution (B) is prepared by mixing 46.3 grams ammonium fluoride and sufficient distilled water to make 5 liters. This solution is filtered through the Millipore Filter described in Example 30. A third solution (C) is prepared by mixing 27.5 ml. of Reagent Grade barium acetate solution (50–55 percent by weight) with 17.1 grams trifluoroacetic acid and sufficient water to make 6 liters of solution. The solution C is placed in the fluted 22-liter flask and stirred vigorously. Then solutions A and B are added at a rate of 83 ml. of each per minute to solution C. The temperature of reaction is 23° C. When the precipitate is immediately washed, collected, dried, and tested as described in Example 30, the speed is 11. No afterglow is observed and the crystals are less than 10 microns in size.

Ignition of these precipitates to high temperatures increases their speeds, but also causes afterglow. Temperatures as low as 300° C. are sufficient to cause afterglow.

Although ammonium fluoride is used for the preparations given in the above examples, good results are also obtained with potassium fluoride. The best speeds are obtained with the ammonium ion. The use of flow rates up to 0.025 mole per minute per liter of reaction solution produces best results. Especially good results are obtained when there is an excess of barium ion in the C solution, and when barium chloride is used. Substitution of barium nitrate for some of the barium chloride in the A solution decreases the speed of the precipitate substantially. Although glass equipment is used in making barium fluorochloride phosphors, plastic or plastic-coated equipment which would not react with fluoride ion can be used and may produce better results. Non-aqueous solvents may also be used.

The emission spectrum of the precipitated phosphors extends from 300 to 500 nm., which is similar to that of the ignited materials prepared by the methods of the prior art.

The efficiency of fluorescence of precipitated barium fluorochloride phosphors can be increased by ripening the precipitate in the reaction solution. The ripened precipitates do not have appreciable afterglow.

EXAMPLE 33—BARIUM FLUOROCHLORIDE

A 1.35 M solution of barium chloride is prepared with distilled water and filtered through a Type HAWP Millipore Filter with 0.45$\mu$ pores. Then 925 ml. of this solution are mixed with sufficient water to make 5 liters of solution A. Another solution (B) is prepared by mixing 46.3 grams ammonium fluoride with sufficient water to make 5 liters. This solution is also filtered. A third solution (C) is prepared by mixing 27.5 ml. of barium acetate solution (50–55 percent by weight) and 17.1 grams of trifluoroacetic acid with sufficient water to make 4 liters.

Solution C is placed on the fluted 22-liter flask described in Example 7, and is stirred vigorously in the manner described in that example. Solutions A and B are then added simultaneously to solution C at a rate of 250 ml. of each per minute. The temperature of reaction is 20° C. When the reaction is complete, the reaction mixture is heated to 95°C. with stirring and then held at this temperature for 1 hour. The precipitate is then washed four times by decantation with 2-liter portions of distilled water, collected, and dried. The speed of the dried precipitate is measured with excitation by X-rays in the manner described in Example 30. The speed is 24, compared with the speed of 11 that is obtained in Example 32. When the precipitate is heated to 300° C. for one hour, the speed increases to a value of 28.

EXAMPLE 34—BARIUM FLUOROCHLORIDE

Solutions A and B of Example 33 are prepared as before. A third solution is prepared by mixing 55.5 ml. of 1.35 M barium chloride solution and 17.1 grams trifluoroacetic acid with sufficient distilled water to make 4 liters of solution (C).

Solution C is placed in the fluted 22-liter flask described in Example 7, stirred vigorously as described in Example 7. Solutions A and B are added simultaneously to Solution C at a rate of 250 ml. of each per minute. The temperature of reaction is 20° C. When the reaction is complete, the reaction mixture is heated to 95° C. with stirring and held at this temperature for one hour. The precipitate is then washed four times with 2-liter portions of distilled water, collected and dried. The speed of the dry precipitate is measured with excitation by X-rays in the manner described before. The speed is 29. When the precipitate is heated to 300° C. for one hour, the speed increases to 35. A sample of commercial calcium tungstate phosphor has a speed of 40 when measured in a similar way.

The sizes of the crystals prepared in Example 33 and Example 34 are relatively small when compared with those prepared by the classical ignition method. The edges of the largest precipitated crystals are less than 10 microns long, and those of most of the crystals are less than 3 microns long. The crystals of the ignited material have edges as long as 40 microns.

To compare afterglow of the precipitated phosphors with that of an ignited phosphor, the phosphor samples are given twice the exposure that is used in measuring the speeds, then they are place in contact with the X-ray film described in Example 30 and stored overnight in the dark. When the film is developed for five minutes in Kodak developer D–19$b$ at 68° F., the developed density produced by the ignited phosphor is 0.67; the density produced by the precipitated phosphors cannot be detected. Heating the phosphors to 300° C. for one hour after precipitation and before testing does not produce detectable afterglow.

These examples show that precipitated and ripened barium fluorochloride phosphors have high speed which is not greatly improved by heating to 300° C. This high speed is not accompanied by large grain size and afterglow, as is the case with phosphors prepared by ignition to high temperatures.

Another phosphor which contains fluoride ion, and which can be prepared by the procedure of the invention, is an activated barium fluoride. The fluorescence of barium fluoride was reported by P. Schuhknecht in 1905, but the method of preparation was not described. Recently, Kaplyanskii and Feofilov have reported that europium-activated barium fluoride does not show the characteristic europium fluorescence, even at temperatures below 77° K. This invention provides a convenient method for preparing barium fluoride phosphors with good efficiency of luminescence at room temperature when excited by X-rays or by ultraviolet radiation. The preparation of such phosphors is demonstrated in Examples 35 and 36, below.

EXAMPLE 35

A solution (A) is prepared by mixing 172 grams of 55 percent barium acetate solution (Reagent Grade) with 3.1 ml. of 0.4M europium triacetate solution (prepared by mixing 7 grams of 99.9 percent europium oxide with 16.8 grams of glacial acetic acid and sufficient distilled water to make 100 ml of solution). Sufficient distilled water is added to make 1.5 liters of solution. The solution is then heated to 70° C.

Solution B is prepared by mixing 27.8 grams of Reagent Grade ammonium fluoride with sufficient distilled water to make 1.5 liters of solution. This solution is also heated to 70° C.

A third solution (C) is prepared by mixing 1.85 grams of ammonium fluoride with sufficient distilled water to make 2 liters of solution. This solution is heated to 95° C in a fluted around bottomed 6-liter flask, then agitated by a glass stirrer with a hollow cylindrical blade 1⅝ inches long and one-half inch in diameter, rotating at 1,000–2,000 rpm., while solutions A and B are added simultaneously at rates of 67 ml. of each per minute. When the addition is complete, the precipitate is washed four times by decantation with distilled water, collected and dried at room temperature.

After drying, the precipitate is tested as described in Example 30. The speed is 30, compared with 100 for lead-activated barium sulfate. Again, the maximum size of the crystals of the precipitate is less than 5 microns.

EXAMPLE 36

A solution (A) is prepared by mixing 172 grams of a 55 percent solution of Reagent Grade barium acetate with 9.4 ml. of the 0.4 M europium triacetate solution. Distilled water is added to make 1.5 liters of solution, which is then heated to 70° C.

Solution B is prepared as in Example 35. Solution C is prepared by mixing 2.78 grams of the ammonium fluoride with sufficient distilled water to make 2 liters. Solution B is heated to 70° C. Solution C is placed in the 6-liter flask and heated to 95° C. Solution C is then agitated vigorously as described before while solutions A and B are added simultaneously at 67 ml. of each per minute. Solution A is passed through a Jones Reductor before entering the reaction solution, in order to reduce the europium ion to the divalent form. When the addition is complete, the precipitate is ripened in the supernatant liquid for 2 hours at 95° C. It is then washed with distilled water four times by decantation, collected and dried at room temperature.

When tested as described in Example 30, the precipitate no detectable speed with excitation by X-rays. However, bright blue florescence is observed when the phosphor is excited with ultraviolet radiation at 250, 300 and 312 nm.

Calcium tungstate phosphor with good efficiency of fluorescence and negligible afterglow when excited by X-rays, cathode rays or ultraviolet radiation is prepared from solutions of calcium and tungstate salts by the method of the invention, preferably in the presence of a small excess of tungstate ion, followed by ripening (e.g., in the supernatant liquid at 95° C. for a time exceeding one-half hour), washing and drying. The efficiency of the precipitate can be enhanced, if desired, by heating.

The preparation of calcium tungstate phosphors by the procedure of the invention is demonstrated in Examples 37–40, below.

EXAMPLE 37—CALCIUM TUNGSTATE

A 3M solution of calcium chloride is prepared with distilled water and reagent Grade calcium chloride. A 1.91 M solution of reagent Grade sodium tungstate is prepared by dissolving the crystals in distilled water. Both solutions are filtered with Type HAWP 04700 Millipore filters with 0.47μ pores. A solution (A) is prepared by diluting 416 ml. of the 3M calcium chloride solution with sufficient water to make 5 liters. Another solution (B) is prepared by diluting 655 ml. of the 1.91 M sodium tungstate solution with sufficient water to make 5 liters. A third solution (C) is prepared by mixing 65.5 ml. of the 1.91 M tungstate solution with sufficient water to make 6 liters. All three solutions are heated to 50° C. Then the pH of solution (B) is adjusted by adding 1.25 grams of sodium hydroxide and that of solution (C) is adjusted by adding 0.125 gram of sodium hydroxide.

Solution (C) is placed in a 22-liter round bottom flask with fluted sides, as described in Example 7, and is vigorously agitated in the manner described in that example. Solutions (A) and (B) are then added to solution (C) at rates of 250 ml. of each per minute. The temperature of reaction is 50° C.

After the addition, the temperature of the mixture of precipitate and reaction solution is increased to 95° C. and held at that temperature for 1 hour. Then the precipitate is washed four times by decantation with distilled water, collected, and dried in vacuum at 110° C. After drying, the precipitate is placed in Corning Vycor evaporating dishes and heated for one-half hour in a muffle furnace, at various temperatures. Then the samples are placed in cups at a coverage of 0.8 gram per square centimeter and irradiated with 70 kvp. X-rays, filtered by one-half millimeter of copper and 1 mm of aluminum. The fluorescence is measured with the X-ray film described in Example 30, placed in contact with the cups containing the phosphors. The exposed film is developed for 5 minutes in Kodak developer D–19b in a tank at 20° C. It is fixed, washed, and dried in the usual manner. The developer densities are compared with those produced by commercial lead-activated barium sulfate at a coverage of 0.6 gram per square centimeter and a commercial calcium tungstate phosphor at a coverage of 0.8 gram per square centimeter. The speed of the commercial lead-activated barium sulfate is set equal to 100, and the relative speeds of the other materials are calculated from the characteristic curve of the film. The results of this example are summarized in Table I.

TABLE I

Effect of Heating on Speed of $CaWO_4$ Precipitate

| Temperature | X-Ray Speed |
| --- | --- |
| 100° | 10 |
| 200° | 14 |
| 300° | 20 |
| 400° | 28 |
| 500° | 25 |
| 600° | 36 |
| 700° | 72 |
| 800° | 74 |
| 900° | 78 |
| 1000° | 84 |

The afterflow of these heated precipitates is also measured. The precipitates are given a long exposure to X-rays, then placed in contact with the X-ray film for 15 minutes. The developed densities after this exposure are negligible when the precipitates are heated to temperatures below 800° C. Afterglow is observed when the precipitates are heated to temperatures above 800° C.

This example shows that calcium tungstate precipitates that are ripened in the supernatant solution for one hour have good speed after heating to temperatures up to 700° C. The sizes of the crystals of the precipitate are not affected by this heat treatment. The particular precipitate that is formed in this example has grains that are up to about 8 microns in diameter. No sintering is observed at temperatures up to 700° C. A commercial calcium tungstate phosphor also has grains that are smaller than 8 microns in diameter, and its speed is 40. Thus, the method described in this example yields a phosphor with better speed and no more afterglow than the commercial calcium tungstate phosphor. The commercial calcium tungstate phosphor having a speed of 40 is the most efficient calcium tungstate phosphor that could be obtained on the market. Calcium tungstate phosphors obtained from two other manufacturers have relative speeds, respectively, of 10 and 25. Reference to "commercial" calcium tungstate phosphor herein is to the highest speed (40) commercial calcium tungstate phosphor, unless otherwise indicated.

EXAMPLE 38–CALCIUM TUNGSTATE

A solution (A) is prepared by diluting 416 ml. of the 3M calcium chloride solution of Example 37 with sufficient distilled water to make 5 liters. Another solution (B) is prepared by mixing 625 ml. of a filtered 2M sodium tungstate solution with 1.5 grams of sodium hydroxide and sufficient water to make 5 liters. A third solution (C) is prepared by mixing 62.5 ml. of the sodium tungstate solution with 0.15 gram of sodium hydroxide and sufficient water to make 6 liters.

Solution (C) is placed in the 22-liter round bottom flask with fluted sides and agitated as described in Example 7. Then solutions (A) and (B) are added at rates of 250 ml. of each per minute. The temperature of reaction is 25° C. After the addition, the precipitate and the reaction solution are heated to 95° C. and held at that temperature for 4 hours. The precipitate is then washed four times by decantation, collected, and dried in vacuum at 110° C. The dry precipitate has a speed of 21 when tested as described in Example 37. Thus, the calcium tungstate prepared by the invention at 25° C. and ripening at 95° C. has substantial speed, even without heating to temperatures above 100° C. The spherical crystals are less than 10 $\mu$ in diameter.

EXAMPLE 39—CALCIUM TUNGSTATE

A solution (A) is prepared by diluting 416 ml. of 3M calcium chloride with sufficient distilled water to make 5 liters. Another solution (B) is prepared by mixing 655 ml. of 1.91 M sodium tungstate solution and 2.5 grams sodium hydroxide with sufficient water to make 5 liters. A third solution (C) is prepared by mixing 41.6 ml. of calcium chloride and sufficient water to make 6 liters. All of these solutions are heated to 50° C.

Solution (C) is placed in the 22-liter fluted flask and agitated vigorously with a glass stirrer. Then solutions (A) and (B) are added at rates of 250 ml. of each per minute to solution (C). When the addition is completed, the mixture of precipitate and supernatant liquid is heated with stirring to 95° C. and held at this temperature for one hour. The precipitate is then washed by decantation with water and dried as described before. Round crystals, approximately 12 microns in diameter are obtained.

The precipitates are heated in Vycor crucibles for one half hour at 100°, 300°, 400°, 600° and 700° C. The speeds, measured as described in Example 37 after heating, are 2, 24, 40, 44 and 62, respectively. These precipitates, prepared with excess calcium chloride, do not sinter until the temperature is above 700° C.

EXAMPLE 40—CALCIUM TUNGSTATE

Solutions (A) and (B) are prepared as described in Example 39. Then they are heated to 50° C. Solution (C) is prepared by mixing 65.5 ml. of filtered 1.91 M sodium tungstate solution and 0.25 gram sodium hydroxide with sufficient water to make 6 liters. Is is placed in the 22-liter flask, heated to 50° C., and agitated as described in Example 7. Solutions (A) and (B) are added to solution (C) at rates of 250 ml. of each per minute. When the addition is completed, the mixture of precipitate and supernatant liquid is heated with stirring to 95° C. and held at this temperature for one hour. The precipitate is then washed by decantation with distilled water and dried as described in Example 38.

This preparation is repeated, but the temperature of reaction is 95° C. instead of 50° C. The precipitate is ripened in the supernatant liquid for one hour at 95° C., then washed, collected, and dried as before.

The speeds of the dry precipitate prepared as described in the first paragraph of this example are 6, 19, 29 and 55, after heating for one half hour at 100° C., 300° C., 500° C. and 700° C., respectively. The speeds of the dry precipitate prepared as described in the second paragraph of this example are 0, 19, 28, and 35, after heating for one half hour at 100° C., 300° C., 500° C., and 700° C., respectively.

Thus, the procedure described in this invention, i.e. precipitate at low temperatures such as under 60° C., then heat to high temperatures and ripen at that high temperature for 1 hour, produces better results than precipitation at high temperatures and ripening at high temperatures.

Alkaline earth and other metal carbonate phosphors which fluoresce when excited by X-rays or ultraviolet radiation are prepared by the method of this invention. These phosphors are prepared from inexpensive raw materials and are suitable for use in radiographic systems, including those where a disposable intensifying screen is advantageous. The phosphors are also soluble in solutions of sequestering agents or in acidic solutions. Thus, they can be dissolved after use, when coated in or on top of integral screen radiographic materials. These phosphors are easy to prepare and do not require ignition to high temperatures in order to obtain appreciable radiographic speed. The variety of colors of emitted light which can be obtained are useful in color radiographic systems. The preparation of alkaline earth and other metal carbonate phosphors in accordance with the invention is illustrated in examples 41–45.

EXAMPLE 41 —BARIUM LEAD CARBONATE

A 1.0 M solution of lead acetate is prepared as described in Example 21. A 1.25 M solution of ammonium carbonate is prepared by dissolving Reagent Grade ammonium carbonate in sufficient distilled water to make the solution, followed by filtration with the Millipore Filter as described before.

A solution (A) is prepared by mixing 149 grams of a 55 percent solution Reagent Grade barium acetate with 0.3 ml. of 1.0 M lead acetate solution, 6 ml. of glacial acetate acid, and sufficient distilled water to make 1.25 liters. A second solution (B) is prepared by mixing 350 ml. of 1.25 M ammonium carbonate with sufficient distilled water to make 1.25 liters. A third solution (C) is prepared by mixing 45 ml. of 1.25 M ammonium carbonate and 6 ml. glacial acetic acid with sufficient water to make 1.5 liters. Solution C is placed in a fluted 6-liter round bottom flask as described in Example 35 and heated to 95° C. Solutions A and B are heated to 70° C., then added at a rate of 71.5 ml. of each per minute to Solution C, which is continuously agitated by a glass stirrer with a hollow blade 1⅝ inches long, rotating at about 2,000 rpm. When the addition is complete, the precipitate is washed four times by decantation with distilled water, collected, and dried at 100° C. in a vacuum oven.

The dry precipitate is placed in a cup at a coverage of 0.6 gram per square centimeter and exposed to 70 kvp. X-rays, filtered by one-half mm copper and 1 mm of aluminum. The fluorescence is measured with the film described in Example 7, and the exposure required to produce a given developed density is compared with that required for a commercial lead-activated barium sulfate phosphor. The latter is assigned a speed of 100. On this scale, the speed of the precipitate is 4.5. When the precipitate is excited with radiation at $\lambda$=254 nm., bright blue fluorescence is observed.

EXAMPLE 42 —LEAD CARBONATE

A solution (A) is prepared by mixing 309 ml. of the lead acetate solution described in Example 41 and 6 ml. of glacial acetic acid with sufficient distilled water to make 1.25 liters. Solutions B and C of Example 41 are prepared as described before. Solution C is placed in the fluted 6-liter round bottom flask and is vigorously agitated after heating to 95° C. Solutions A and B are heated to 70° C. and then added to Solution C at a rate of 71.5 ml. of each per minute Solution C is vigorously agitated during this addition as described before. When the addition is complete, the precipitate is washed four times by decantation with distilled water, collected, and dried at 100° C. in a vacuum oven. When tested at a coverage of 0.8 gram per square centimeter as described before, the speed of the phosphor is 3. When excited by radiation at $\lambda$=254 nm., a blue-white fluorescence is observed.

EXAMPLE 43 —BARIUM LEAD CARBONATE

A solution (A) is prepared by mixing 149 grams of a 55% solution of Reagent Grade barium acetate with 3 ml. of 1.0 M lead acetate solution, 6 ml. of glacial acetic acid, and sufficient distilled water to make 1.25 liters. Solutions B and C of Example 41 are also prepared. Solution C is heated to 95° C. in the fluted round bottomed flask and solutions A and B are added after preheating to 70° C. as described in Example 41. The dried precipitate is placed in a cup at a coverage of 0.6 gram per square centimeter and exposed to 70 kvp. X-rays, filtered by one-half mm copper and 1 mm of aluminum. The fluorescence is measured with the X-ray film described in Example 30, and developed for 5 minutes in Kodak developer D–19b at 68° F. Comparison with the effect produced by commercial lead-activated barium sulfate phosphor shows that the speed of the lead-activated barium carbonate is 4, compared with 100 for the lead-activated barium sulfate. Bright blue fluorescence is observed when the dry precipitate is excited with radiation at λ=254 nm.

EXAMPLE 44 —COPPER-ACTIVATED STRONTIUM CARBONATE

One-molar solutions of cupric chloride and strontium chloride (Reagent Grade) are prepared with distilled water. A solution (A) is prepared by mixing 313 ml. of 1 M strontium chloride, 0.1 ml. of 1M cupric chloride, 7 grams ascorbic acid, 0.8 gram sodium hydroxide, and sufficient distilled water to make 1.25 liters. A second solution (B) is prepared by mixing 300 ml. of 1.25 M ammonium carbonate solution with sufficient distilled water to make 1.25 liters as described in Example 41. A third solution (C) is prepared by dissolving 45 ml. of the 1.25 M ammonium carbonate and 20 grams of ascorbic acid in sufficient water to make 1.5 liters. Solution C is heated to 80° C. in the flask described in Example 35, then solutions A and B, preheated to 70° C., are added simultaneously at rates of 71.5 ml. of each per minute to solution C, which is vigorously agitated, as in Example 35, during the addition. The precipitate is washed, collected, and dried as described before. When excited with λ=365 nm. radiation, a bright blue-white fluorescence was observed. With excitation by X-rays, fluorescence is not detected.

EXAMPLE 45 —EU-ACTIVATED BARIUM CARBONATE

A solution (A) is prepared by mixing 150 grams of a 55 percent solution of Reagent Grade barium acetate with 0.322 gram europium trichloride (99.9 percent), 6 ml. of glacial acetic acid, and sufficient distilled water to make 1.25 liters. A second solution (B) is prepared by mixing 155 ml. of 1.25 M ammonium carbonate and 155 ml. of 1.25 M sodium carbonate solutions (Reagent Grade) with sufficient distilled water to make 1.25 liters. A third solution (C) is prepared by mixing 22 ml. of 1.25 M ammonium carbonate and 22 ml. of 1.25 M sodium carbonate solutions with sufficient distilled water to make 1.5 liters. Solutions A and B are heated to 70° C. and then simultaneously at rates of 71.5 ml. of each per minute to the vigorously stirred solution C which had been preheated to 95° C. in the round bottomed flask, as described in Example 35. The precipitate is washed, collected, and dried as described in Example 41. When excited with 313 nm. radiation, bright red fluorescence is observed.

Variations:

Satisfactory phosphors are made with other activators, other concentrations of activators, and other heavy metal carbonates. Generally speaking, the best results are obtained with a small excess of carbonate ion in the reaction solutions, with relatively slow run times, and with only mild heating after the precipitate is dried. Strong heating causes loss of speed and the appearance of color in the phosphor, in some cases, particularly when the phosphor contains lead ion. The rare earths produce strong luminescence in these carbonate phosphors, when excited with ultraviolet radiation.

Alkaline earth phosphate phosphors which fluoresce when excited by X-rays or ultraviolet radiation are prepared by the method of this invention. The preparation of these phosphors is illustrated in Examples 46 and 47.

EXAMPLE 46—EU-ACTIVATED BARIUM PHOSPHATE

A 1.35 M solution of barium chloride is prepared with distilled water and barium chloride dihydrate and filtered as described before. A 0.4 M solution of europium trichloride is prepared by mixing 10.3 grams of 99.9 percent europium trichloride with sufficient distilled water to make 100 ml. of solution. This solution is also filtered as described before. A 1.0 M solution of reagent grade diammonium hydrogen phosphate $((NH_4)_2HPO_4)$ is also prepared and filtered.

A solution (A) is prepared by mixing 274 ml. of the 1.35 M barium chloride solution and 9.4 ml. of the 0.4 M europium chloride solution with sufficient distilled water to make 1.5 liters. A second solution (B) is prepared by mixing 250 ml. of the 1.0 M diammonium hydrogen phosphate solution with sufficient distilled water to make 1.5 liters. Solutions A and B are then heated to 70° C. A third solution (C) is prepared by mixing 25 ml. of the 1.0 M diammonium hydrogen phosphate solution with 10 ml. of 3M ammonium chloride (made from reagent grade ammonia and hydrochloric acid as described before) and sufficient distilled water to make 2 liters. Solution C is placed in the fluted 6-liter flask and heated to 95° C. Then solutions A and B are then added to solution C at a rate of 67 ml. of each per minute. During this addition the reaction solution is agitated vigorously with the glass stirrer rotating at 1,000–2,000 rpm. as described before.

When the addition is complete, the precipitate is washed four times by decantation, collected, and dried in air at room temperature. The speed of the phosphor is then measured as described in Example 30. The speed of the precipitate is 8, compared with a speed of 100 for lead-activated barium sulfate. The crystal structure of the precipitate is studied by X-ray diffraction; the pattern is that of $BaHPO_4$.

EXAMPLE 47

A solution (A) is prepared by mixing 172 grams of 55 percent solution of reagent grade barium acetate with 3.1 ml. of the 0.4 europium trichloride solution described in Example 46, and sufficient distilled water to make 1.5 liters. A second solution (B) is prepared by mixing 250 ml. of the 1.0 M diammonium hydrogen phosphate solution with sufficient water to make 1.5 liters. A third solution (C) is prepared by mixing 25 ml. of the 1.0 M diammonium hydrogen phosphate solution with sufficient distilled water to make 2 liters.

Solutions A and B are heated to 70° C. Solution C is placed in the 6-liter flask described before, and heated to 95° C. Solutions A and B are then added to solution C at a rate of 67 ml. of each per minute. Solution A passed through a Jones Reductor before entering Solution C. During the addition, solution C is vigorously agitated by the glass stirrer described before. When the addition is complete, the precipitate is washed four times with distilled water. It is then collected and dried in air at room temperature.

When the dried precipitate was irradiated with ultraviolet radiation at the wavelengths, 248, 298, 312, and 365 nm., brilliant blue luminescence is observed.

The invention has been described in detail with particular reference to preferred embodiments thereof, but, it will be understood that variations and modifications can be effected within the spirit and scope of the invention described hereinabove and in the appended claims.

It is claimed:

1. The method of forming inorganic phosphors containing anion and cation as the host material, and having a solubility in water of less than 5 grams per liter at 25° C, said phosphors further containing an anion or cation activator element different from the phosphor host material cation and anion in an amount sufficient to produce luminescence in the phosphor, which method comprises separately introducing into a solution in which said phosphors are formed, (1) anion to form the phosphor at the rate of up to 0.1 mole anion per liter of available solution per minute, and (2) cation to form the phosphor at a rate of up to 0.1 mole cation per liter of available solution per minute; maintaining throughout the reaction in which the phosphors are formed, a concentration up to about 1 molar of either an excess of said anions over said cations or an excess of said cations over said anions; preventing local excesses of said anion and said cation in said solution in which said phosphors are formed; and growing crystals of the phosphor to at least 0.5 micron in size.

2. The method of forming phosphors as defined in claim 1 wherein said anion and said cation, each, are introduced into said solution in which said phosphors are formed at the rate of up to 0.4 mole per liter of solution per minute.

3. The method of forming phosphors as defined in claim 2 wherein said solution contains, throughout the reaction, an excess selected from an excess of anion over cation and an excess of cation over anion, said excess being chosen to provide the most efficient luminescence of the phosphor being formed, and said excess being up to 1 molar.

4. The method of forming phosphors as defined in claim 2 wherein said excess maintained is up to 0.5 molar.

5. The method of forming phosphors as defined in claim 2 wherein said solution contains, throughout the reaction, an excess selected from an excess of anion over cation and an excess of cation over anion, said excess being chosen to provide efficient luminescence of the phosphor being formed, and said excess being up to 0.1 molar.

6. The method of forming phosphors as defined in claim 1 wherein said anion and said cation are introduced into said solution from separate solutions of said anion and cation, each of said separate solutions containing a concentration of up to 1.5 molar, respectively, anion and cation.

7. The method of forming phosphors as defined in claim 4 wherein said anion and said cation are introduced into said solution from separate solutions of said anion and cation, each of said separate solutions containing a concentration of up to 1 molar, respectively, anion and cation.

8. The method of forming phosphors as defined in claim 5 wherein said anion and said cation are introduced into said solution from separate solutions of said anion and cation, each of said separate solutions containing a concentration of up to 0.5 molar, respectively, anion and cation.

9. The method of forming phosphors as defined in claim 6 wherein said phosphors are grown to a size of at least 1 micron.

10. The method of forming phosphors as defined in claim 1 wherein said local excesses are prevented by agitating the solution in which said phosphors are formed.

11. The method of forming phosphors in accordance with claim 1 wherein the phosphors are ripened at an elevated temperature.

12. The method of forming phosphors as defined in claim 11 wherein the phosphors are ripened in the solution in which said phosphors are formed.

13. The method of forming phosphors as defined in claim 1 wherein said phosphors are selected from the group consisting of phosphors containing at least one covalently bonded atom in the molecule thereof, and phosphors containing fluoride ion.

14. The method of forming phosphors as defined in claim 6 wherein the anion of said phosphor is selected from the group consisting of sulfate, fluoride, tungstate, carbonate, silicate, vanadate, phosphate, arsenate, borate, sulfide and molybdate and the activator element different from the phosphor host material cation and anion is selected from the group consisting of lead, thallium, copper, manganese and a rare earth and the cation of said phosphors is selected from the group consisting of the elements which are cations in Series 3 through 11 of Mendeleeff's Periodic Table.

15. The method of forming barium lead sulfate phosphor as defined in claim 1.

16. The method of preparing barium lead sulfate phosphors which comprises:

a. simultaneously introducing barium and lead ions into a solution in which said phosphors are formed at the rate of less than about 0.1 mole combined barium and lead ions per liter of solution in which said phosphors are formed per minute;

b. maintaining an excess of sulfate ions in the solution in which said phosphors are formed of less than about 0.5 molar over the amount required to react with the barium and lead ions in the solution in which said phosphors are formed;

c. agitating the solution in which said phosphors are formed; and, d. precipitating crystals of barium lead sulfate having a size of at least 0.5 micron.

17. The method of preparing barium lead sulfate phosphors as defined in claim 16 wherein an univalent cation is maintained in the solution in which said phosphors are formed in an amount sufficient to effectively enhance the fluorescence of the barium lead sulfate phosphors.

18. The method of preparing barium lead sulfate phosphors as defined in claim 16 wherein said barium and lead ions are introduced into the solution in which said phosphors are formed from a solution containing a concentration of less than about 0.5 molar barium and lead ions.

19. The method of preparing barium lead sulfate phosphors as defined in claim 18 wherein said solution in which said phosphors are formed has solubility characteristics for barium lead sulfate phosphors substantially equivalent to an aqueous acidic solution having a pH of less than about 2, and containing sulfate ions at a concentration of less than about 0.5 molar, at a temperature of 70° to 100° C.

20. The method of preparing barium lead sulfate phosphors as defined in claim 19 wherein said barium and lead ions are introduced into the solution in which said phosphors are formed at the rate of less than about 0.04 mole barium and lead ions per liter of solution in which said phosphors are formed per minute; and, said excess of sulfate ions is less than about 0.1 molar.

21. The method of preparing barium lead sulfate phosphors which comprises:

a. providing an aqueous solution in which said phosphors are formed;

b. introducing into the aqueous solution in which said phosphors are formed a plurality of streams of aqueous solutions of water soluble barium and lead salts, said solutions containing concentrations of barium and lead ions of less than about 0.5 molar, and controlling the addition of said solutions so that the combined addition of barium and lead ions to the aqueous solution in which said phosphors are formed is at the rate of less than about 0.04 mole combined barium and lead ions per liter of solution in which said phosphors are formed per minute;

c. introducing into the aqueous solution in which said phosphors are formed an aqueous solution containing a water soluble sulfate salt, said solution having a concentration of sulfate ion of not greater than about 1.5 molar, and controlling the addition of the aqueous sulfate solution so that there is in the aqueous solution in which said phosphors are formed an excess of sulfate ion over that required to react with the barium and lead ions in the solution in which said phosphors are formed at any given time during the precipitation, said excess being less than 0.1 molar;

d. holding the pH of the solution in which said phosphors are formed throughout the precipitation at less than about 1 with the addition of an acid selected from the group consisting of hydrochloric, hydrobromic, trifluoroacetic, trichloroacetic, dichloroacetic, monochlorodifluoroacetic, benzene sulfonic, perchloric and hypophosphorous acids;

e. maintaining the temperature of the solution in which said phosphors are formed throughout the precipitation in the range of about 70° to 100° C; and, f. agitating the solution in which said phosphors are formed during the precipitation of the barium lead sulfate phosphors.

22. The method of preparing barium lead sulfate phosphors which comprises:
a. providing an aqueous solution in which said phosphors are formed;
b. introducing into the aqueous solution in which said phosphors are formed a plurality of streams of aqueous solutions of water soluble barium and lead salts, said solutions containing concentrations of barium and lead ions of less than about 0.5 molar, and controlling the addition of said solutions so that the combined addition of barium and lead ions to the aqueous solution in which said phosphors are formed is at the rate of less than about 0.04 mole combined barium and lead ions per liter of solution in which said phosphors are formed per minute;
c. introducing into the aqueous solution in which said phosphors are formed an aqueous solution containing a water soluble sulfate salt, said solution having a concentration of sulfate ion of not greater than about 1.5 molar, and controlling the addition of the aqueous sulfate solution so that there is in the aqueous solution in which said phosphors are formed an excess of sulfate ion over that required to react with the barium and lead ions in the solution in which said phosphors are formed at any given time during the precipitation, said excess being less than 0.1 molar;
d. maintaining in the solution in which said phosphors are formed an univalent cation selected from the group consisting of lithium, sodium, cesium, potassium and ammonium in an amount sufficient to effectively enhance the fluorescence of the barium lead sulfate phosphors;
e. holding the pH of the solution in which said phosphors are formed throughout the precipitation at less than about 1 with the addition of an acid selected from the group consisting of hydrochloric, hydrobromic, trifluoroacetic, trichloroacetic, dichloroacetic, monochlorodifluoroacetic, benzene sulfonic, perchloric and hypophosphorous acids;
f. maintaining the temperature of the solution in which said phosphors are formed throughout the precipitation in the range of about 70° to 100° C; and,
g. agitating the solution in which said phosphors are formed during the precipitation of the barium lead sulfate phosphors.

23. The method of preparing barium lead sulfate phosphors which comprises:
a. providing an aqueous solution in which said phosphors are formed;
b. introducing into the aqueous solution in which said phosphors are formed a plurality of streams of aqueous solutions of water soluble barium and lead salts, said solutions containing concentrations of barium and lead ions of less than about 0.5 molar, and controlling the addition of said solutions so that the combined addition of barium and lead ions into the aqueous solution in which said phosphors are formed is at the rate of less than about 0.1 mole combined barium and lead ions per liter of solution in which said phosphors are formed per minute;
c. introducing into the aqueous solution in which said phosphors are formed an aqueous solution containing a water soluble sulfate salt, and controlling the addition of the aqueous sulfate solution so that there is in the aqueous solution an excess of sulfate ion over that required to react with the barium and lead ions in the solution in which said phosphors are formed at any given time during the precipitation, said excess being less than 0.5 molar;
d. holding the pH of the solution in which said phosphors are formed throughout the precipitation at less than about 2 with the addition of an acid which does not substantially decrease the fluorescence of the barium lead sulfate phosphors; and
e. agitating the solution in which said phosphors are formed during the precipitation of the barium lead sulfate phosphors.

24. The method of preparing barium lead sulfate phosphors which comprises:
a. providing an aqueous solution in which said phosphors are formed;
b. introducing barium and lead ions into the solution in which said phosphors are formed at the rate of less than about 0.1 mole combined barium and lead ions per liter of solution in which said phosphors are formed per minute;
c. maintaining in the solution in which said phosphors are formed an excess of sulfate ion over that required to react with the barium and lead ions in the solution in which said phosphors are formed at any time during the precipitation, said excess being less than 0.5 molar;
d. holding the pH of the solution in which said phosphors are formed throughout the precipitation at less than about 2 with the addition of an acid which does not substantially decrease the fluorescence of the barium lead sulfate phosphors; and
e. agitating the solution in which said phosphors are formed during the precipitation of the barium lead sulfate phosphors.

25. The method of preparing barium lead sulfate phosphors which comprises:
a. providing an aqueous solution in which said phosphors are formed;
b. introducing barium and lead ions into the solution in which said phosphors are formed at the rate of less than about 0.1 mole combined barium and lead ions per liter of solution in which said phosphors are formed per minute;
c. maintaining in the solution in which said phosphors are formed an excess of sulfate ion over that required to react with the barium and lead ions in the solution in which said phosphors are formed at any time during the precipitation, said excess being less than 0.5 molar;
d. maintaining in the solution in which said phosphors are formed an univalent cation in an amount to effectively enhance the fluorescence of the barium lead sulfate phosphors;
e. holding the pH of the solution in which said phosphors are formed throughout the precipitation at less than about 2 with the addition of an acid which does not substantially decrease the fluorescence of the barium lead sulfate phosphors; and
f. agitating the solution in which said phosphors are formed during the precipitation of the barium lead sulfate phosphors.

26. The process of preparing barium lead sulfate phosphors which comprises preparing an aqueous solution consisting of about 0.24 molar barium chloride, 0.013 molar lead chloride and 0.013 molar hydrochloric acid; preparing a second aqueous solution consisting of about 0.25 molar sodium sulfate; preparing a third aqueous solution consisting of about 0.023 molar sodium sulfate and about 0.5 molar hydrochloric acid; simultaneously adding the first and second solutions at the rate of about 22 ml per minute to about 220 ml of the third solution, vigorously agitated in a 4 liter-capacity beaker, while maintaining the temperature of the mixture at about 80° to 95° C; and, recovering barium lead sulfate phosphor.

27. The method of forming lanthanide-activated alkaline earth sulfate phosphors as defined in claim 1.

28. The method of forming lanthanide-activated barium sulfate phosphors in accordance with claim 27 wherein an excess of sulfate ions over the amount required to react with the barium and lanthanide ions is maintained in the solution in which said phosphors are formed, said excess being up to 0.5 molar; and, the rate of addition of the anions and cations to form said phosphor, each, is less than 0.04 mole per liter of solution in which said phosphors are formed per minute.

29. The method of forming lanthanide-activated barium sulfate phosphors in accordance with claim 28 wherein said excess of sulfate ions is less than about 0.1 molar.

30. The method of forming lanthanide-activated barium sulfate phosphors in accordance with claim 29 wherein the solution in which said phosphors are formed is an aqueous acidic solution having a pH of less than 0.5, and the reaction is conducted at about 100° C.

31. The method of forming lanthanide-activated barium sulfate phosphors in accordance with claim 28 wherein an univalent cation is maintained in the solution in which said phosphors are formed throughout the reaction in an amount sufficient to effectively quench chemiluminescence and enhance precipitation of the lanthanide.

32. The method of forming lanthanide-activated barium sulfate phosphors in accordance with claim 30 wherein an univalent cation is maintained in the solution throughout the reaction in an amount from about 0.02 to 0.2 molar.

33. The method of preparing lanthanide-activated barium sulfate phosphors as defined in claim 30 wherein the lanthanide-activator is europium.

34. The method of preparing lanthanide-activated barium sulfate phosphors as defined in claim 32 wherein the lanthanide-activator is europium.

35. The method of forming lanthanide-activated alkaline earth sulfate phosphors as defined in claim 30 wherein chemiluminescence of said phosphor is removed by heating the phosphor at about 200° C.

36. The method of forming lanthanide-activated barium sulfate phosphors in accordance with claim 31 wherein the rate of addition of said anions and cations to form said phosphor, each, is less than 0.025 mole per liter of solution in which said phosphors are formed per minute.

37. The method of forming lead sulfate phosphors as defined in claim 1.

38. The method of forming lead sulfate phosphors as defined in claim 37 wherein the lead and sulfate ions to form said phosphor are introduced into the solution in which said phosphors are formed at the rate of less than 0.04 mole per liter of solution in which said phosphors are formed per minute.

39. The method of forming lead sulfate phosphors as defined in claim 38 wherein said solution in which said phosphors are formed contains, throughout the reaction, an excess of lead ions over the amount required to react with the sulfate ions at any time during the reaction, said excess being less than 0.5 molar.

40. The method of forming lead sulfate phosphors as defined in claim 38 wherein an univalent cation is present in the solution in which said phosphors are formed in an amount sufficient to effectively enhance the fluorescence of the phosphor.

41. The method of forming lead sulfate phosphors as defined in claim 40 wherein the univalent cation is selected from ammonium ion and sodium ion, and said univalent cation is present in the solution in which said phosphors are formed at a concentration of from 0.019 to 0.075 molar.

42. The method of forming lead sulfate phosphors as defined in claim 40 wherein said solution in which said phosphors are formed in an aqueous acidic solution having a pH below 1, and said reaction is conducted at a temperature of at least 50° C.

43. The method of forming barium fluorochloride phosphor as defined in claim 1.

44. The method of forming barium fluorochloride phosphor as defined in claim 43 wherein the anions and cations to form said phosphor, each, are introduced into the solution in which said phosphors are formed at the rate of less than 0.04 mole per liter of solution in which said phosphors are formed per minute.

45. The method of forming barium fluorochloride phosphor as defined in claim 43 wherein the anions and cations to form said phosphor, each, are introduced into the solution in which said phosphors are formed at the rate of less than 0.025 mole per liter of solution in which said phosphors are formed per minute.

46. The method of increasing the efficiency of barium fluorochloride phosphors prepared in accordance with claim 44 which comprises ripening said phosphors.

47. The method of increasing the efficiency of barium fluorochloride phosphors as defined in claim 46 wherein said ripening is effected in the solution in which said phosphors are formed, and at a temperature of from 80° to 100° C.

48. The method of forming calcium tungstate phosphors as defined in claim 1.

49. The method of forming calcium tungstate phosphors as defined in claim 48 wherein the calcium and tungstate ions to form said phosphor, each, are introduced into the solution in which said phosphors are formed at the rate of less than 0.04 mole per minute per liter of solution in which said phosphors are formed.

50. The method of forming calcium tungstate phosphors as defined in claim 48 wherein said solution in which said phosphors are formed is an aqueous solution having a pH of at least 7.

51. The method of increasing the efficiency of calcium tungstate phosphors prepared in accordance with claim 49 which comprises ripening said phosphors.

52. The method of increasing the efficiency of calcium tungstate phosphors as defined in claim 51 wherein said ripening is effected in the solution in which said phosphors are formed.

53. The method of forming calcium tungstate phosphors as defined in claim 52 wherein said solution in which said phosphors are formed is maintained at a temperature of about 20 to 50° C during the reaction of the calcium ions with the tungstate ions, and said ripening is conducted in the solution in which said phosphors are formed at a temperature of from 70° to 100° C.

54. The method of increasing the efficiency of calcium tungstate phosphors as defined in claim 51 wherein said phosphors, after said ripening, are heated to a temperature sufficient to further increase the efficiency thereof.

55. The method of increasing the efficiency of calcium tungstate phosphors as defined in claim 52 wherein said phosphors, after said ripening, are heated to a temperature sufficient to further increase the efficiency thereof.

56. The method of increasing the efficiency of calcium tungstate phosphors as defined in claim 55 wherein said phosphors are heated to about 700° C for about one-half hour.

57. The method of increasing the efficiency of calcium tungstate phosphors prepared in accordance with claim 49 which comprises heating said phosphors to a temperature sufficient to increase the efficiency thereof.

58. The method of increasing the efficiency of calcium tungstate phosphors as defined in claim 57 wherein said phosphors are heated to about 700° C for about one-half hour.

59. The method of increasing the efficiency of calcium tungstate phosphors as defined in claim 56 wherein said heating is conducted in the absence of flux.

60. The method of increasing the efficiency of calcium tungstate phosphors as defined in claim 58 wherein said heating is conducted in the absence of flux.

61. The method of forming lead carbonate and alkaline earth carbonate phosphors as defined in claim 1.

62. The method of forming lead carbonate and alkaline earth carbonate phosphors as defined in claim 61 wherein the anions and cations to form said phosphor, each, are introduced into said reaction solution at the rate of less than 0.04 mole per minute per liter of reaction solution.

63. The method of forming lead carbonate and alkaline earth carbonate phosphors as defined in claim 62 wherein said solution in which said phosphors are formed contains, throughout the reaction, an excess of carbonate ions over that required to react with the cations, in the solution in which said phosphors are formed at any time during the reaction, said excess being up to about 0.1 molar.

64. The method of forming phosphors of the group consisting of europium-activated barium sulfate, terbium-activated barium sulfate, samarium-activated barium sulfate, gadolinium-activated barium sulfate and cerium-activated barium sulfate as defined in claim 8 wherein said cation is the alkaline earth barium.

65. The method of forming phosphors as defined in claim 8 wherein said phosphors are selected from the group consisting of barium lead sulfate, lanthanide-activated barium sulfate, lead sulfate, barium bismuth sulfate, barium calcium manganese sulfate, lanthanide-activated barium fluoride, barium fluorochloride, calcium tungstate, lead carbonate, lanthanide-activated barium hydrogen phosphate and the alkaline earth carbonate phosphors.

66. The method of forming inorganic phosphor having an anion and a cation, said phosphor being selected from the group consisting of barium lead sulfate, lanthanide-activated barium sulfate, lead sulfate, barium bismuth sulfate, barium calcium manganese sulfate, lanthanide-activated barium fluoride, barium fluorochloride, calcium tungstate, lead carbonate, lanthanide-activated barium hydrogen phosphate, and the alkaline earth carbonate phosphors, which comprises:
  a. providing an aqueous solution in which said phosphors are formed adapted to permit said anions and cations to form crystals of said phosphor of at least .5 micron in size;
  b. introducing anion to form said phosphor into said solution in which said phosphors are formed at the rate of up to 0.1 mole per liter of solution in which said phosphors are formed per minute;
  c. simultaneously introducing cation to form said phosphor into said solution in which said phosphors are formed at the rate of up to 0.1 mole per liter of solution in which said phosphors are formed per minute;
  d. maintaining said solution in which said phosphors are formed, throughout the reaction, a concentration of less than 0.5 molar, each of said anions and cations; and,
  e. agitating the solution in which said phosphors are formed throughout the reaction.

67. The method of forming phosphors as defined in claim 66 wherein said anions and said cations, each, are introduced into said solution in which said phosphors are formed from separate aqueous solutions thereof, each of said solutions having a concentration of less than about 0.5 molar anion and cation, respectively.

68. The method of forming phosphors as defined in claim 67 wherein a plurality of streams of said solutions of anions and said cations are introduced into said solution in which said phosphors are formed.

69. The method of preparing barium lead sulfate phosphor as defined in claim 23 wherein the reaction is conducted in the absence of nitrate ion.

70. The method of preparing lead sulfate phosphor as defined in claim 40 wherein the reaction is conducted in the absence of nitrate ion.

71. The method of preparing barium fluorochloride phosphor as defined in claim 44 wherein the reaction is conducted in the absence of nitrate ion.

72. The method of preparing lead carbonate phosphor as defined in claim 63 wherein the reaction is conducted in the absence of nitrate ion.

73. The method of preparing alkaline earth carbonate phosphor as defined in claim 63 wherein the reaction is conducted in the absence of nitrate ion.

74. The method of forming barium bismuth sulfate in accordance with claim 1.

75. The method of forming barium calcium manganese sulfate in accordance with claim 1.

76. The method of forming lanthanide-activated barium hydrogen phosphate in accordance with claim 1.

77. The method of forming lanthanide-activated barium fluoride in accordance with claim 1.

* * * * *